(12) United States Patent
Oki

(10) Patent No.: US 8,579,756 B2
(45) Date of Patent: Nov. 12, 2013

(54) RECLINING MECHANISM

(71) Applicant: Delta Kogyo Co., Ltd., Hiroshima (JP)

(72) Inventor: Yasukazu Oki, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 13/679,240

(22) Filed: Nov. 16, 2012

(65) Prior Publication Data

US 2013/0137545 A1    May 30, 2013

(30) Foreign Application Priority Data

Nov. 25, 2011  (JP) .................................. 2011-258025
Nov. 25, 2011  (JP) .................................. 2011-258026

(51) Int. Cl.
*F16H 3/44* (2006.01)

(52) U.S. Cl.
USPC ......................................................... 475/300

(58) Field of Classification Search
USPC ................................................. 475/300, 331
See application file for complete search history.

(56) References Cited

U.S. PATENT DOCUMENTS

| | | | | |
|---|---|---|---|---|
| 3,438,283 | A * | 4/1969 | Schwerdhofer | 475/259 |
| 6,279,714 | B1 | 8/2001 | Hsu | |
| 7,544,142 | B2 * | 6/2009 | Schuler et al. | 475/149 |
| 2003/0200627 | A1 | 10/2003 | Becker et al. | |
| 2005/0245348 | A1 * | 11/2005 | Liu | 475/331 |
| 2006/0244296 | A1 * | 11/2006 | Drew | 297/362 |
| 2011/0169313 | A1 | 7/2011 | Schulz et al. | |

FOREIGN PATENT DOCUMENTS

JP         5-1335         1/1993

* cited by examiner

*Primary Examiner* — Edwin A Young
(74) *Attorney, Agent, or Firm* — Gerald E. Hespos; Michael J. Porco; Matthew T. Hespos

(57) ABSTRACT

Disclosed is a reclining mechanism comprising: a first plate fixed to a seat back; a second plate fixed to a seat cushion; a plurality of planetary gears in meshing engagement with internal gears of the first and second plates; a sun gear in meshing engagement with the planetary gears; and a holding member rotatably holding the planetary gears. An inner peripheral wall of the holding member and an opposing wall section of the sun gear define therebetween a wedge-shaped space in which a restriction member is displaceably disposed. The opposing wall section of the sun gear is formed such that a width of the wedge-shaped space is gradually narrowed toward a counter direction opposite to a specific direction along which the first plate is urged to be rotated according to a force applied to the seat back in a rearward tilting direction.

8 Claims, 21 Drawing Sheets

RECLINING MECHANISM

TECHNICAL FIELD

The present invention relates to a reclining mechanism for a seat such as a vehicle seat.

BACKGROUND ART

Heretofore, there has been known a reclining mechanism for a seat such as a vehicle seat, as disclosed, for example, in Japanese Utility Model Laid-Open Publication No. 05-001335 (hereinafter referred to as "Patent Document 1"). A reclining mechanism disclosed in the Patent Document 1 comprises: a base plate (first plate) and an arm plate (second plate) coaxially supported in a rotatable manner and formed, respectively, with two opposed circular holes having an internal gear (internally-toothed gear) section thereinside; a control gear provided on a rotary shaft of the two plates; a plurality of planetary gears arranged in meshing engagement with the internal gear section of the plates and the control gear, and each protrudingly provided with a boss portion at an axis thereof; and a holding member rotatably holding each of the planetary gears at a trajectory of revolution thereof. This holding member is composed of a spring member which is adapted to contact the respective boss portions of the planetary gears while permitting a rotation thereof, and bias each of the planetary gears in a radial direction (in a direction causing the planetary gear to be brought in meshing engagement with the internal gear section of the plates. This reclining mechanism can suppress wobbling due to a backlash between the internal gear section of the two plates (base and arm plates) and each of the planetary gears, etc.

However, even in the case where the planetary gears are biased by the holding member composed of a spring member as described in the Patent Document 1, for example, when a force equal to or greater than a biasing force of the holding member is applied to a seat back, the planetary gears are likely to be displaced radially inwardly against the biasing force of the holding member, causing wobbling between the internal gear section of the plates and each of the planetary gears. On the other hand, if the biasing force of the holding member is increased, a rotational resistance of each of the planetary gears becomes larger, precluding smooth rotation thereof. As above, the technique using the holding member composed of a spring member as in the Patent Document 1 has a problem of being unable to sufficiently suppress wobbling between the internal gear section of the plates and each of the planetary gears.

Moreover, in the reclining mechanism disclosed in the Patent Document 1, when a force is repeatedly applied to the seat back in a rearward tilting direction thereof, each of the planetary gears is likely to being slightly rollingly displaced with respect to the internal gear section of the plates. If this situation occurs, the seat back will be gradually tilted rearwardly with respect to a seat cushion, thereby making it impossible to maintain the seat back in a fixed state.

SUMMARY OF THE INVENTION

It is an object of the present invention to provide a reclining mechanism capable of preventing each planetary gear from being rollingly displaced according to a force repeatedly applied to a seat back so as to reliably maintain the seat back in a fixed state.

In order to achieve the above object, the present invention provides a reclining mechanism which comprises: a ring-shaped first plate fixed to a seat back; a ring-shaped second plate capable of rotating with respect to the first plate and fixed to a seat cushion; a plurality of planetary gears in meshing engagement with internal gears provided in respective inner peripheries of the first plate and the second plate; a sun gear in meshing engagement with the planetary gears; a holding member rotatably holding the planetary gears and having an inner peripheral wall surrounding the sun gear; and a restriction member for restricting a rotation of the holding member with respect to the sun gear. The sun gear has an opposing wall section opposed to the inner peripheral wall of the holding member. The opposing wall section of the sun gear and the inner peripheral wall of the holding member define therebetween a wedge-shaped space in which the restriction member is displaceably disposed. The opposing wall section of the sun gear is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

DESCRIPTION OF EMBODIMENTS

<First Embodiment>

With reference to FIG. 1 to FIG. 11, a first embodiment of the present invention will now be described in detail.

Figure 1:
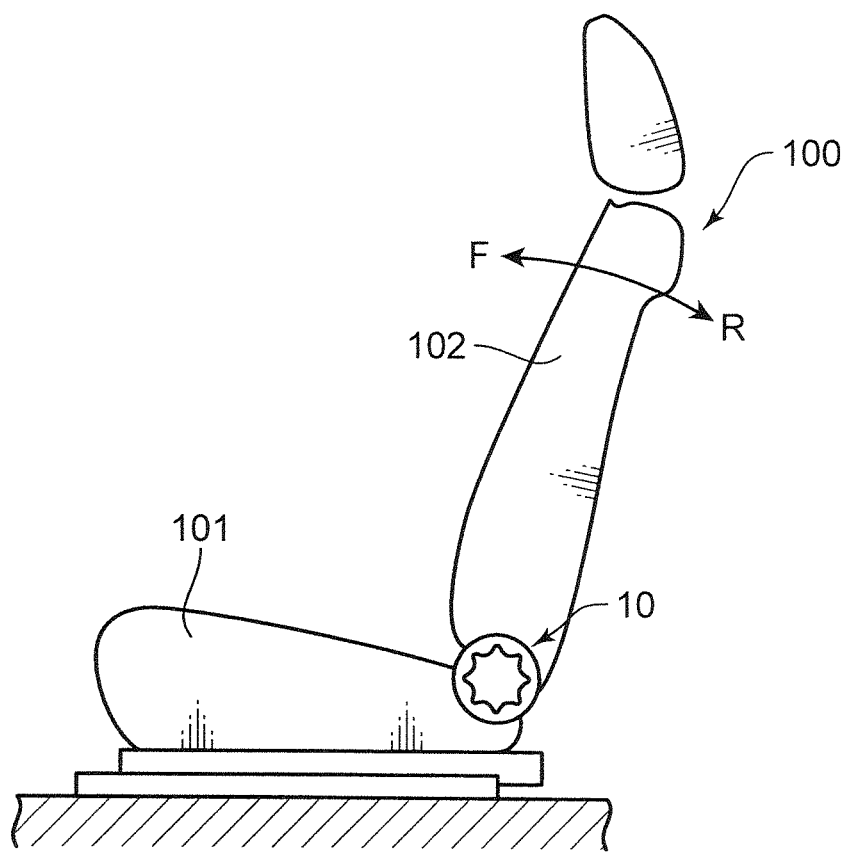
FIG. 1 is a side view of an automobile seat equipped with a reclining mechanism according to a first embodiment of the present invention.

A reclining mechanism 10 according to the first embodiment is designed to be used in an automobile seat 100, as illustrated in FIG. 1. As illustrated in FIGS. 2 to 6, the reclining mechanism 10 comprises: a first plate 1; a second plate 2; a plurality of planetary gears 3a to 3c; a sun gear 4; a first holding member 5a and a second holding member 5b which hold the planetary gears 3a to 3c; a sun gear operating member 6 for rotationally operating the sun gear 4; a restriction member 7 for restricting a rotation of the holding members 5a, 5b; and a biasing member 8 biasing the restriction member 7.

The first plate 1 is composed of a ring-shaped plate having a circular hole 11 in a central region thereof. An inner periphery of the first plate 1 surrounding the circular hole 11 is provided with an internal gear (internally-toothed gear) 12 over the entire circumference thereof. In this embodiment, the internal gear 12 of the first plate 1 is composed of thirty-eight teeth.

The first plate 1 has a receiving portion 13 provided in one lateral surface (in FIG. 2, a right surface) thereof. The receiving portion 13 is formed such that a center-side annular region of the one lateral surface of the first plate 1 is concaved by a predetermined depth.

The first plate 1 configured as above is fixedly attached to a seat back 102 (see FIG. 1) of the seat 100.

The second plate 2 is composed of a ring-shaped plate formed in approximately the same shape as that of the first plate 1 to have a circular hole 21 in a central region thereof. An inner periphery of the second plate 2 surrounding the circular hole 21 is provided with an internal gear (internally-toothed gear) 22 over the entire circumference thereof. In this embodiment, the internal gear 22 of the second plate 2 is composed of thirty-five teeth.

The second plate 2 has a concave portion 23 provided in one lateral surface (in FIG. 2, a right surface) thereof. The concave portion 23 is formed such that a center-side annular region of the one lateral surface of the second plate 2 is concaved by a predetermined depth.

The second plate 2 also has a fitting portion 24 provided in the other lateral surface (in FIG. 2, a left surface) thereof. The fitting portion 24 is formed such that a center-side annular region of the other lateral surface of the second plate 2 is convexed by a predetermined distance. The fitting portion 24 is adapted to be rotatably fitted in the receiving portion 13 of the first plate 1.

When the fitting portion 24 of the second plate 2 is fitted into the receiving portion 13 of the first plate 1, the internal gear 12 of the first plate 1 and the internal gear 22 of the second plate 2 are superposed together while aligning the centers thereof with each other.

The second plate 2 configured as above is fixedly attached to a seat cushion 101 (see FIG. 1) of the seat 100.

In this embodiment, the plurality of planetary gears 3a to 3c consist of three planetary gears each having the same configuration. Each of the planetary gears 3a to 3c has a gear portion 31 with ten teeth, and a shaft portion 32 protrudingly provided on respective opposite sides of the gear portion 31 in an axial direction thereof.

The first holding member 5a is equivalent to a "holding member" set forth in the appended claims, and disposed on one side (in FIG. 2, the right side) of each of the planetary gears 3a to 3c in the axial direction. The second holding member 5b is disposed on the other side (in FIG. 2, the left side) of each of the planetary gears 3a to 3c in the axial direction, and formed to have approximately the same structure as the first holding member 5a. The first holding member 5a and the second holding member 5b are coupled together by three coupling members 52a arranged in a circumferential direction thereof.

The first holding member 5a is composed of a ring-shaped plate member having a circular inner peripheral wall 50. The first holding member 5a is provided with three shaft holding holes 51 for holding the respective shaft portions 32 of the planetary gears 3a to 3c, and three insertion holes 52 for allowing the respective coupling members 52a to be inserted thereinto.

The three shaft holding holes 51 are arranged at even intervals along a pitch circle being concentric with the inner peripheral wall 50 of the first holding member 5a and having a predetermined radius. The three insertion holes 52 are arranged along a pitch circle having approximately the same radius as that of the pitch circle of the shaft holding holes 51. Each of the insertion holes 52 is located between adjacent two of the shaft holding holes 51.

The first holding member 5a configured as above is rotatably received in the concave portion 23 of the second plate 2. On the other hand, the second holding member 5b is attached to the other lateral surface (in FIG. 2, a left surface) of the first plate 1. In this state, the shaft portions 32 of the planetary gears 3a to 3c are inserted into respective ones of the shaft holding holes 51 of the first holding member 5a (and respective ones of similar holes provided in the second holding member 5b) and rotatably held by them. Further, the coupling members 52a are inserted into respective ones of the insertion holes 52 of the first holding member 5a (and respective ones of similar holes provided in the second holding member 5b), so that the first holding member 5a and the second holding member 5b are coupled together through the coupling members 52a.

Figure 3:
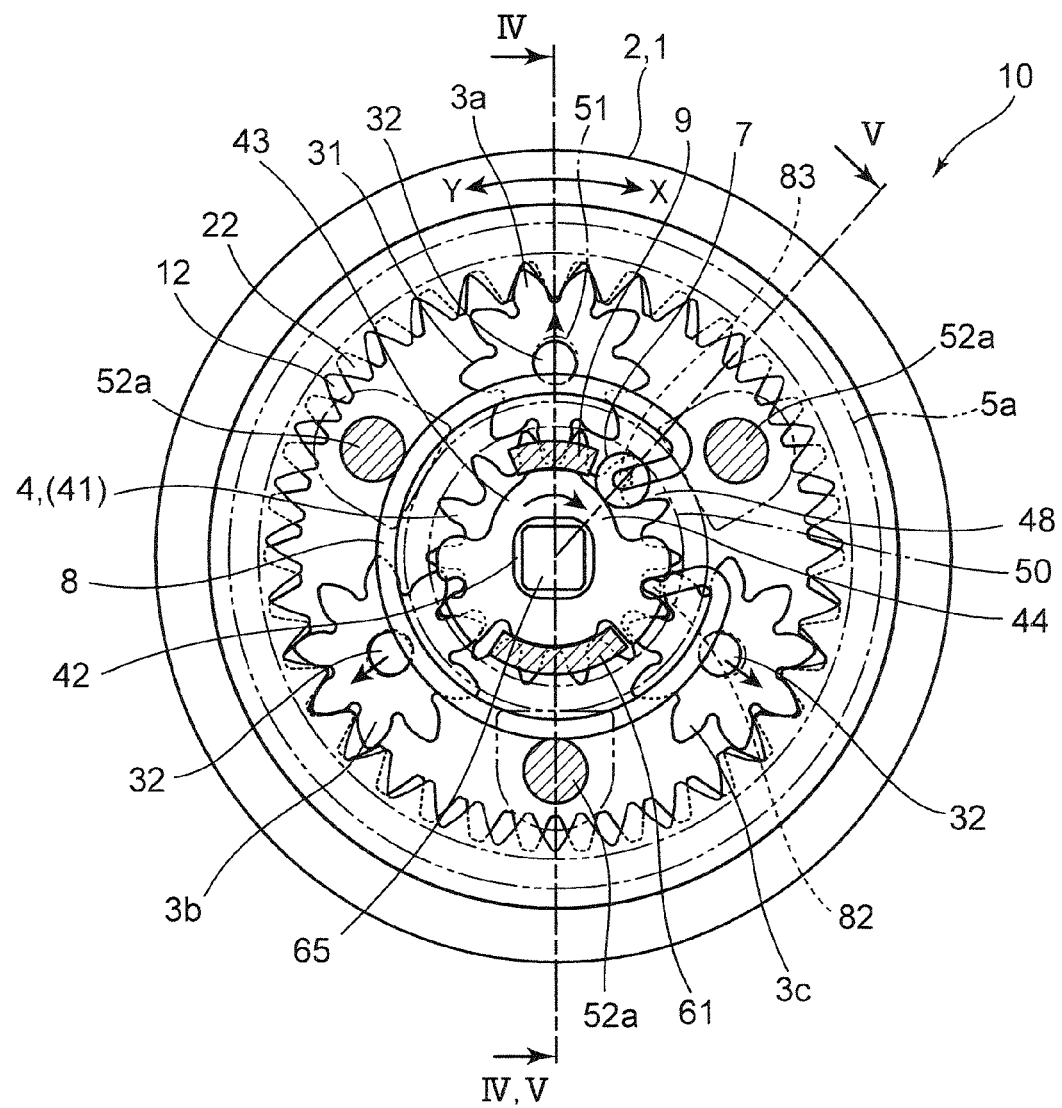
FIG. 3 is a plan view illustrating an internal structure of the reclining mechanism according to the first embodiment.
Figure 4:
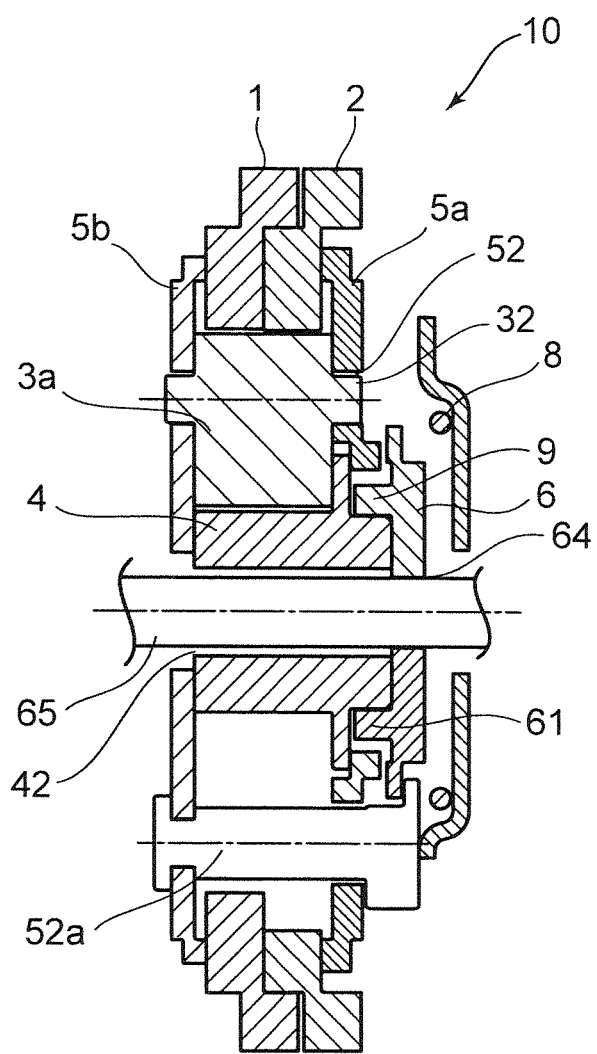
FIG. 4 is a sectional view taken along the line IV-IV in FIG. 3.
Figure 5:
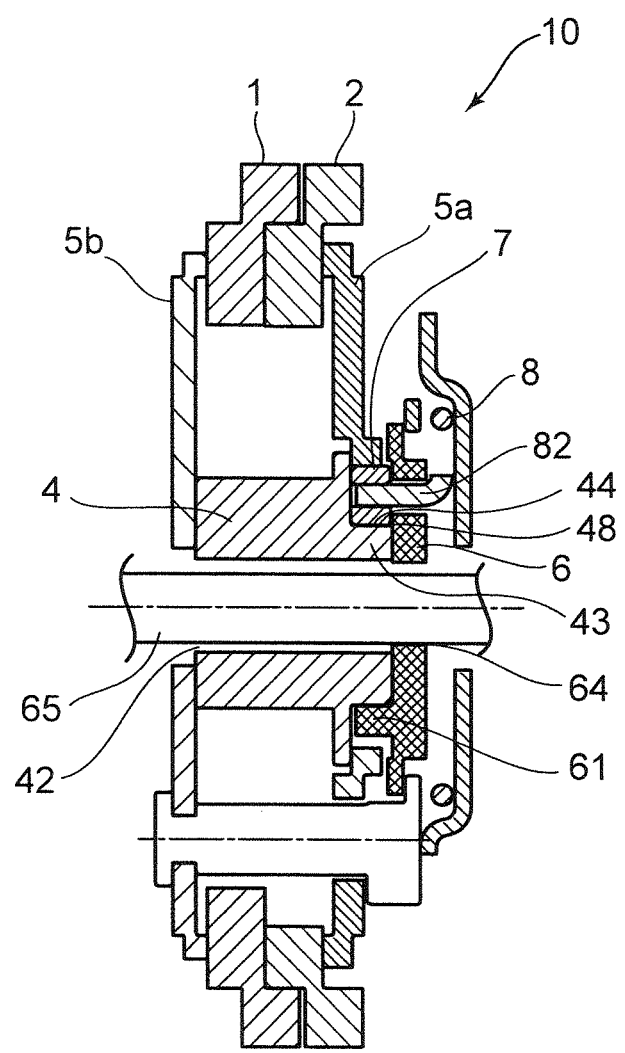
FIG. 5 is a sectional view taken along the line V-V in FIG. 3.

As illustrated in FIGS. 3 to 5, the gear portion 31 of each of the planetary gears 3a to 3c is in meshing engagement with both of the internal gear 12 of the first plate 1 and the internal gear 22 of the second plate 2. As the first holding member 5a is rotated, each of the planetary gears 3a to 3c is displaced (revolved) in a circumferential direction of the first and second plates 1, 2 while being rotated about the shaft portion 32 thereof (rotated on its own axis).

Figure 2:
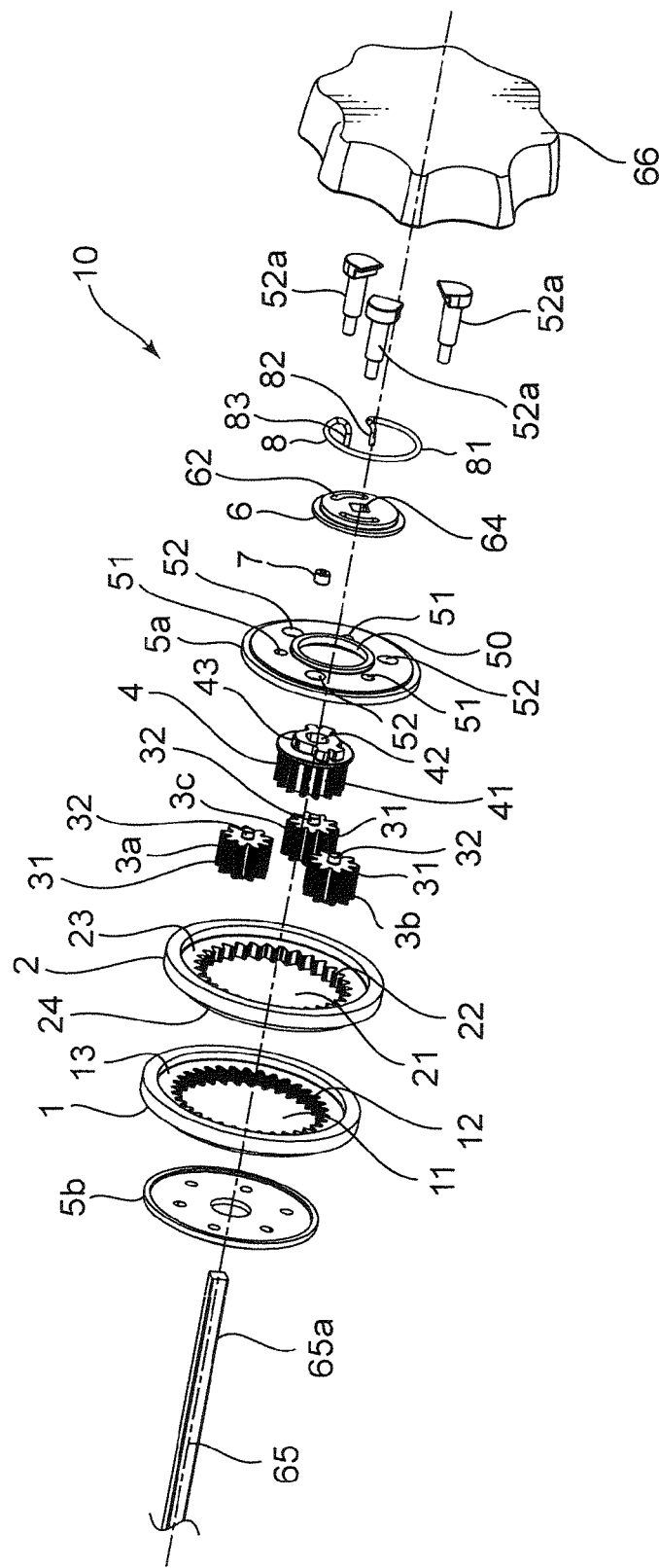
FIG. 2 is an exploded perspective view illustrating a structure of a substantial part of the reclining mechanism according to the first embodiment.

The sun gear 4 will be described below. As illustrated in FIG. 2, the sun gear 4 has a gear portion 41, and a convex portion 43 provided to protrude from the gear portion 41 in an axial direction thereof. The gear portion 41 and the convex portion 43 are provided with a shaft insertion hole 42 penetrating through a central region thereof in the axial direction.

The gear portion 41 has a plurality of teeth provided in an outer periphery thereof and adapted to be in meshing engagement with the respective gear portions 31 of the planetary gears 3a to 3c. In this embodiment, sixteen teeth are provided in the outer periphery of the gear portion 41.

Then, as illustrated in FIGS. 3 to 5, the sun gear 4 is disposed between the first holding member 5a and the second holding member 5b in a coaxial relation to each other. The three planetary gears 3a to 3c are arranged around the sun gear 4 to surround the sun gear 4, and the gear portion 41 of the sun gear 4 and the gear portion 31 of each of the planetary gears 3a to 3c are brought into meshing engagement with each other. Thus, when the sun gear 4 is rotated, each of the planetary gears 3a to 3c is displaced (revolved) in the circumferential direction while being rotated about the shaft portion 32 thereof (rotated on its own axis), and the first and second holding members 5a, 5b are rotated.

Figure 7:
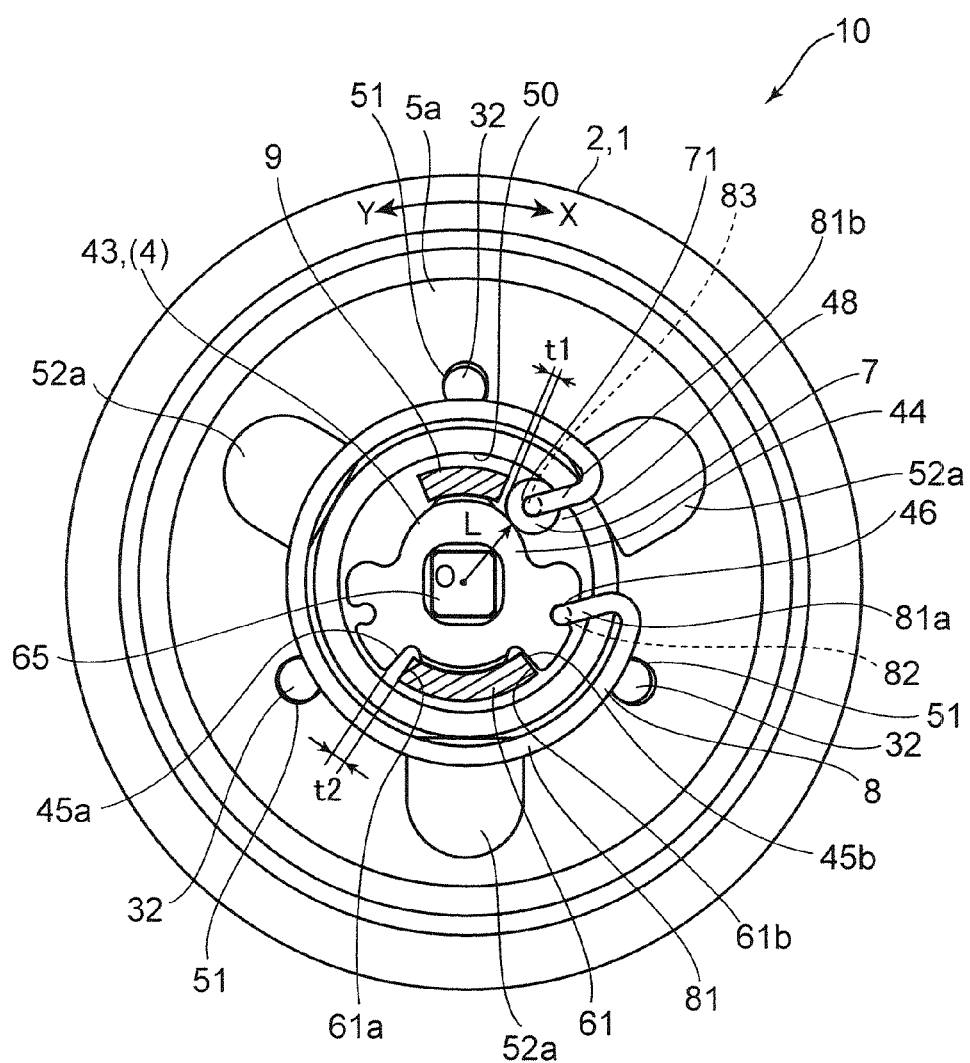
FIG. 7 is an explanatory view illustrating a positional relationship between a restriction member and a restriction releasing convex portion each provided in the reclining mechanism according to the first embodiment.

The convex portion 43 of the sun gear 4 is formed such that a part of one lateral surface (in FIG. 2, a right surface) of the gear portion 41 is convexed in the axial direction by a predetermined distance, as a hollow raised segment surrounding the shaft insertion hole 42. As illustrated in FIG. 7, the convex portion 43 has: an opposing wall section 44 which defines an aftermentioned wedge-shaped space 48 in cooperation with the inner peripheral wall 50 of the first holding member 5a; a first pushable section 45a and a second pushable section 45b provided, respectively, on circumferentially opposite sides of the opposing wall section 44; and a spring locking section 46 provided between the second pushable section 45b and the opposing wall section 44.

Figure 8:
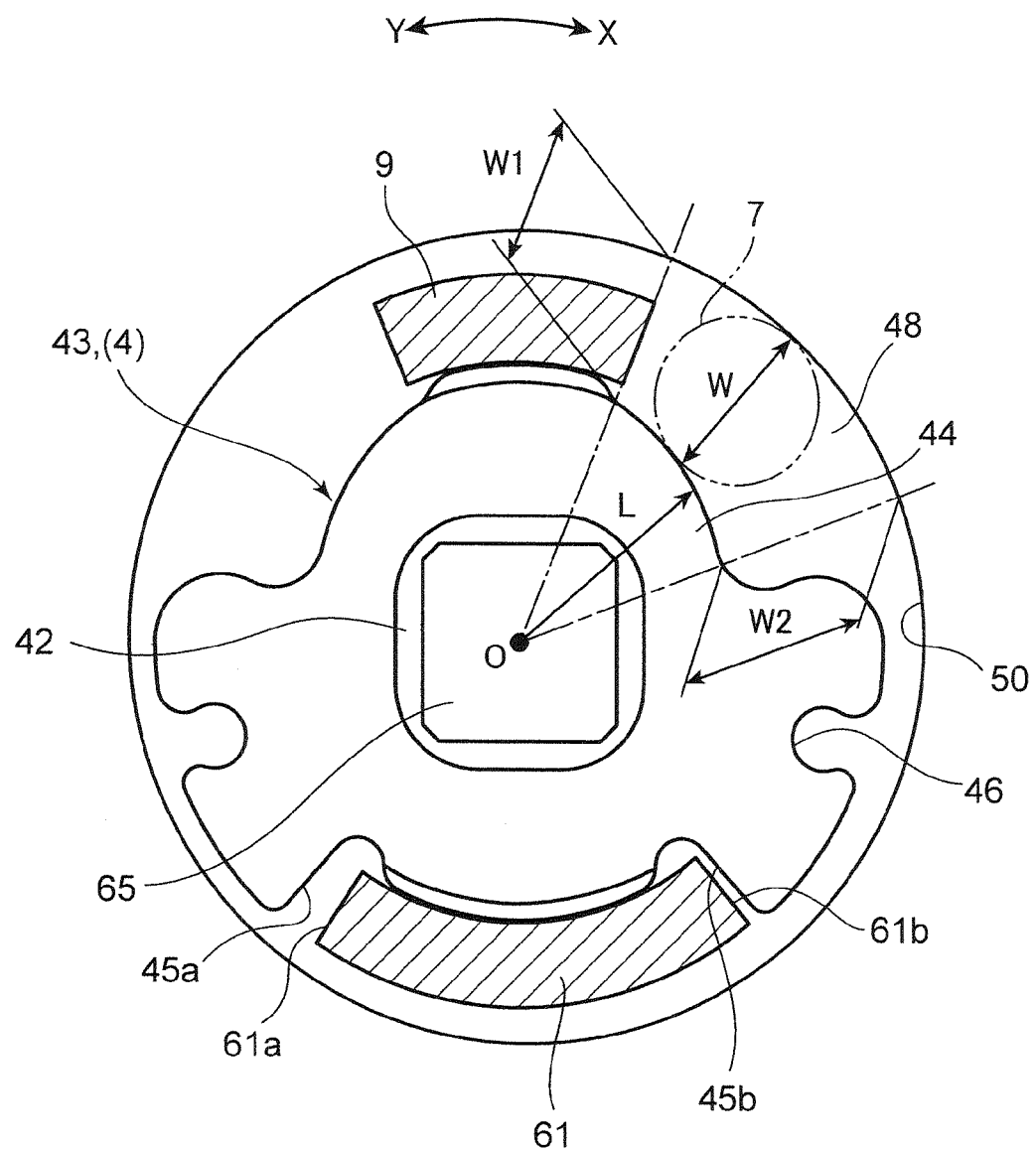
FIG. 8 is an explanatory view enlargedly illustrating a shape of a wedge-shaped space in FIG. 7.
Figure 9:
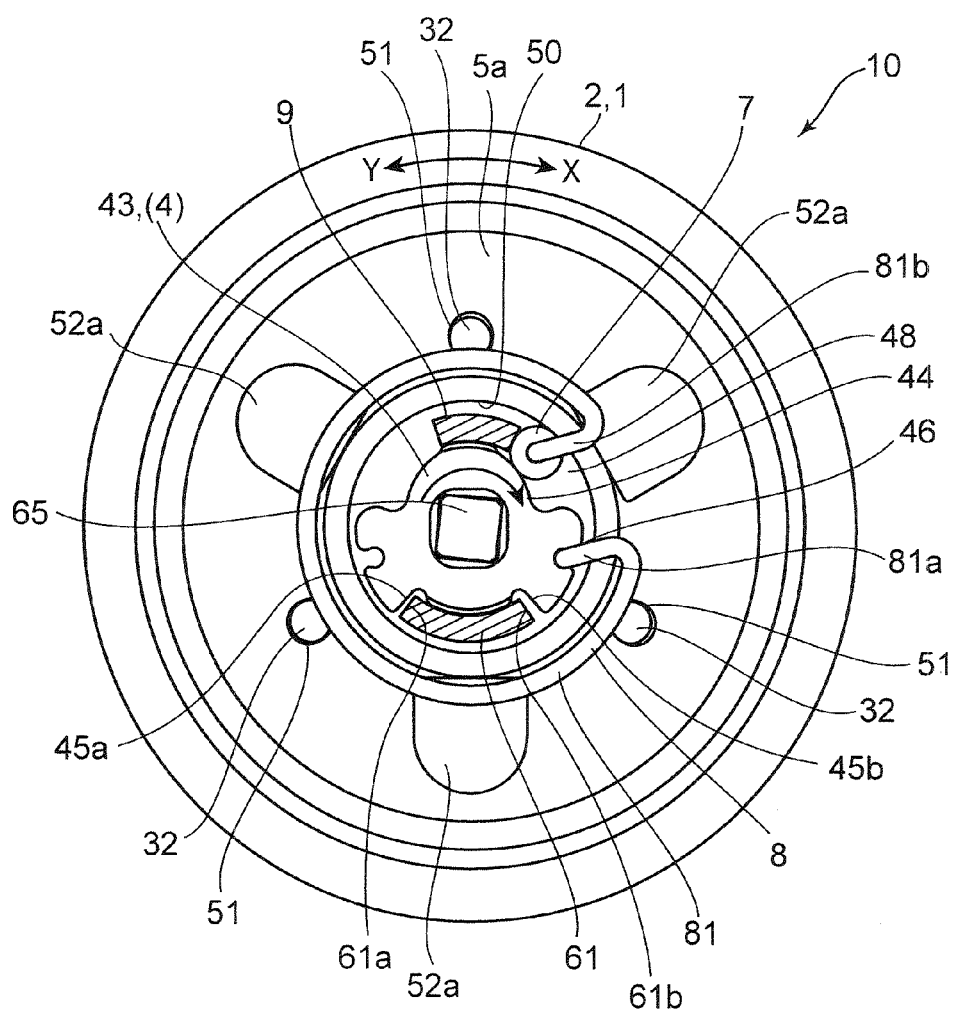
FIG. 9 is an explanatory view illustrating the positional relationship, in a state in which the sun gear operating member is rotated from the state in FIG. 7 in a clockwise direction.

FIG. 8 enlargedly illustrates a positional relationship between the opposing wall section 44 of the sun gear 4 and the inner peripheral wall 50 of the first holding member 5a. As also illustrated in FIG. 8, the opposing wall section 44 of the sun gear 4 is disposed to be opposed to the inner peripheral wall 50 of the first holding member 5a, while being radially spaced apart from each other. An outer peripheral surface of a region of the opposing wall section 44 located on a relatively right side in FIGS. 7 and 8 (i.e., a region of the opposing wall section 44 close to the restriction member 7) is formed such that a distance L from a center O of the sun gear 4 gradually increases toward a counterclockwise direction (in FIGS. 7 and 8, direction indicated by the arrow Y).

The counterclockwise direction in FIGS. 7 and 8 is a direction opposite to a direction along which the first plate 1 is urged to be rotated when a force in a rearward tilting direction R is applied to the seat back 102 (see FIG. 1). In the following description, the direction along which the first plate 1 is urged to be rotated when the force in the rearward tilting direction R is applied to the seat back 102 (in FIGS. 7, 8, etc., a clockwise direction) will be referred to as "specific direction X", and a direction opposite to the specific direction (in FIGS. 7, 8, etc., a counterclockwise direction) will be referred to as "counter direction Y".

The first pushable section 45a and the second pushable section 45b are provides, respectively, at two circumferential positions of the convex portion 43 spaced apart from each other in the specific direction X and the counter direction Y with respect to the opposing wall section 44, to protrude radially from the convex portion 43.

The spring locking section 46 is located between the second pushable section 45b and the opposing wall section 44, and formed to have a concave-shaped outer peripheral surface concaved radially inwardly with respect to an outer peripheral surface of the second pushable section 45b.

The opposing wall section 44 of the sun gear 4 and the inner peripheral wall 50 of the first holding member 5a define therebetween a wedge-shaped space 48 illustrated in FIGS. 3, 7 and 8, and the restriction member 7 is disposed in the wedge-shaped space 48.

A width W (see FIG. 8) of the wedge-shaped space 48 is set to gradually become narrowed toward the counter direction Y, according to the aforementioned shape of the opposing wall section 44 of the sun gear 4. Specifically, because the distance L of the outer peripheral surface of the opposing wall section 44 from the center O of the sun gear 4 gradually increases toward the counter direction Y, a radial distance (clearance) between the opposing wall section 44 and the inner peripheral wall 50 of the first holding member 5a, i.e., a value of the width W of the wedge-shaped space 48, gradually decreases toward the counter direction Y.

Figure 6:
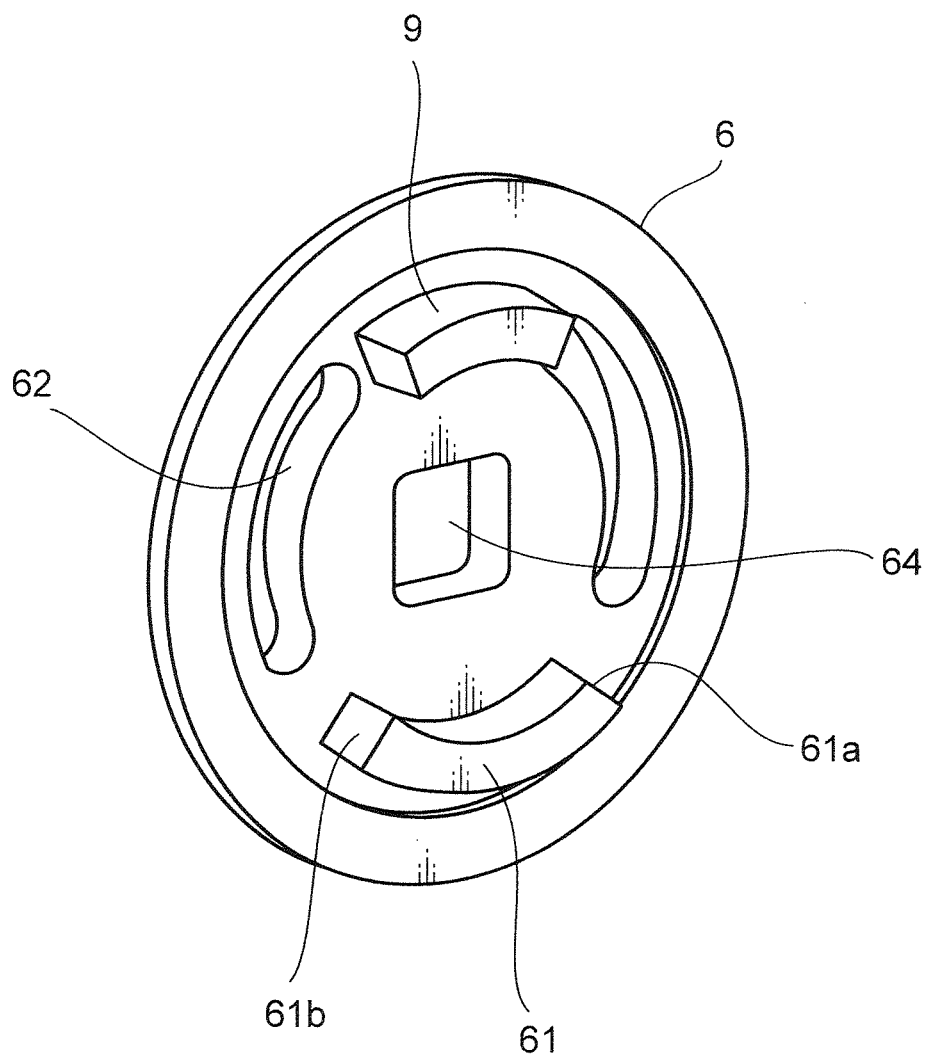
FIG. 6 is a perspective view separately illustrating a sun gear operating member provided in the reclining mechanism according to the first embodiment.

The sun gear operating member 6 will be described below. As illustrated in FIG. 2, the sun gear operating member 6 is composed of a circular disk-shaped plate. More specifically, as illustrated in FIG. 6, the sun gear operating member 6 integrally has a push-operation portion 61 protrudingly provided on a lower region of a lateral surface thereof on the side of the first holding member 5a and the sun gear 4 (in FIG. 2, a left surface), and a restriction releasing convex portion 9 protrudingly provided on an upper region of the lateral surface. Further, a quadrangular-shaped shaft coupling hole 64 is provided in a central region of the sun gear operating member 6 located between the push-operation portion 61 and the restriction releasing convex portion 9.

The push-operation portion 61 is a member for pushing and rotating the sun gear 4, and formed to protrude from the lateral surface of the sun gear operating member 6 on the side of the sun gear 4, by a predetermined distance, and extend in an arc pattern along a circumferential direction of the sun gear operating member 6. The push-operation portion 61 has a first contact section 61a provided at one of opposite ends thereof (an end on a leading side with respect to the specific direction X) in the circumferential direction of the sun gear operating member 6 and adapted to be brought into contact with the first pushable section 45a of the convex portion 43 of the sun gear 4, and a second contact section 61b provided at the other end (an end on a leading side with respect to the counter direction Y) in the circumferential direction of the sun gear operating member 6 and adapted to be brought into contact with the second pushable section 45b of the convex portion 43 of the sun gear 4.

As illustrated in FIG. 7, the push-operation portion 61 is disposed in a gap between the inner peripheral wall 50 of the first holding member 5a and an outer peripheral surface of the convex portion 43 of the sun gear 4, at a position between the first pushable section 45a and the second pushable section 45b. Thus, the first contact section 61a of the push-operation portion 61 is located in opposed relation to the first pushable section 45a of the convex portion 43, and the second contact section 61b of the push-operation portion 61 is located in opposed relation to the second pushable section 45b of the convex portion 43.

The restriction releasing convex portion 9 is a member for releasing a restriction by the restriction member 7, and formed to protrude from the lateral surface of the sun gear operating member 6 on the side of the sun gear 4, by a predetermined distance, and extend in an arc pattern along the circumferential direction of the sun gear operating member 6.

As illustrated in FIGS. 3 and 7, the restriction releasing convex portion 9 is disposed in the gap between the inner peripheral wall 50 of the first holding member 5*a* and the outer peripheral surface of the convex portion 43 of the sun gear 4, at a position adjacent to the restriction member 7 in the counter direction Y, in a circumferentially displaceable manner.

As illustrated in FIG. 7, a gap t1 defined between the restriction releasing convex portion 9 and the restriction member 7 is set to become less than a gap t2 defined between the first contact section 61*a* of the push-operation portion 61 and the first pushable section 45*a* of the sun gear 4.

The sun gear operating member 6 configured as above is non-rotatably coupled to a manual operation dial 66 through an aftermentioned rotary shaft 65.

Specifically, a square pillar-shaped rotary shaft 65 is disposed in a coupling portion between the seat back 102 and the seat cushion 101 of the seat 100, rotatably with respect to the seat back 102 and a seat cushion 101. As illustrated in FIG. 2, the rotary shaft 65 has a first end 65*a* which is rotatably inserted into the second holding member 5*b*, the circular hole 11 of the first plate 1, the circular hole 21 of the second plate 2, the shaft insertion hole 42 of the sun gear 4, and the first holding member 5*a*, in this order. Further, the first end 65*a* of the rotary shaft 65 inserted in the above members is non-rotatably fitted into the shaft coupling hole 64 of the sun gear operating member 6. Thus, the rotary shaft 65 is disposed in a freely relatively rotatable manner with respect to the second holding member 5*b*, the first plate 1, the second plate 2, the sun gear 4 and the first holding member 5*a*, and in a relatively non-rotatable manner with respect to the sun gear operating member 6.

The first end 65*a* of the rotary shaft 65 fitted in the shaft coupling hole 64 of the sun gear operating member 6 is further coupled to the manual operation dial 66 illustrated in FIG. 2, in a relatively non-rotatable manner. Therefore, according to rotation of the manual operation dial 66, the rotary shaft 65 is rotated, and, according to this rotation, the sun gear operating member 6 is rotated.

The restriction member 7 will be described below. The restriction member 7 is designed to restrict the first and second holding members 5*a*, 5*b* from being rotated with respect to the sun gear 4 in the specific direction X. As illustrated in FIGS. 2 and 7, in this embodiment, the restriction member 7 is composed of a columnar-shaped roller having a locking hole 71 along an axis thereof. An outer diameter of the restriction member 7 is set to be less than a width (maximum width) W2 of an end of the wedge-shaped space 48 on a leading side with respect to the specific direction X, and greater than a width (minimum width) W1 of an end of the wedge-shaped space 48 on a leading side with respect to the counter direction Y.

The restriction member 7 is disposed in a circumferentially displaceable manner within the wedge-shaped space 48.

The biasing member 8 will be described below. As illustrated in FIGS. 2, 3 and 7, the biasing member 8 has: an open ring-shaped member body 81; a first bended section 81*a* formed by bending one end of the member body 81 radially inwardly; a sun gear engagement section 82 formed by bending a distal end of the first bended section 81*a* in the same direction as the axial direction of the sun gear 4; a second bended section 81*b* formed by bending the other end of the member body 81 radially inwardly; and a restriction member engagement section 83 formed by bending a distal end of the second bended section 81*b* in the same direction of the restriction member 7 (i.e., in a direction parallel to the sun gear engagement section 82).

As illustrated in FIG. 2, the biasing member 8 configured as above is disposed on the side of one lateral surface (in FIG. 2, a right surface) of the sun gear operating member 6. The sun gear engagement section 82 and the restriction member engagement section 83 of the biasing member 8 are inserted into an elongate hole 62 provided in the sun gear operating member 6, from the side of the one lateral surface.

The sun gear engagement section 82 inserted in the elongate hole 62 is locked to the spring locking section 46 of the sun gear 4.

On the other hand, the restriction member engagement section 83 inserted in the elongate hole 62 is inserted in the locking hole 71 of the restriction member 7. In this manner, the restriction member engagement section 83 is locked to the restriction member 7, and the restriction member 7 is biased in the counter direction Y.

An operation of the reclining mechanism 10 according to the first embodiment configured as above will described below.

When a force in the rearward tilting direction R as illustrated in FIG. 1 is applied to the seat back 102 of the seat 100 incorporating the reclining mechanism 10, a force is applied to the first plate 1 fixed to the seat back 102 to urge the first plate 1 to be rotated in the specific direction X (In FIG. 3, the clockwise direction). Then, according to the rotational force of the first plate 1, a force causing the planetary gears 3*a* to 3*c* to be rollingly displaced in the specific direction X (i.e., a force causing the first holding member 5*a* to be rotated in the specific direction X) is generated, and thus a force causing the sun gear 4 to be rotated in the specific direction X is generated. This is equivalent to pushing the restriction member 7 toward the counter direction Y (in FIG. 3, the counterclockwise direction) in the wedge-shaped space 48 defined between the opposing wall section 44 of the sun gear 4 and the inner peripheral wall 50 of the first holding member 5*a*. Particularly, in the first embodiment, the restriction member 7 is biased in the counter direction Y by the biasing member 8, so that the restriction member 7 is reliably pushed toward the counter direction Y without being displaced in the specific direction X in conjunction with the above movement.

When the restriction member 7 is relatively pushed toward the counter direction Y (i.e., in a direction causing the width W of the wedge-shaped space 48 to become narrower), the restriction member 7 is brought into such a situation that it bites into a narrow region of the wedge-shaped space 48, so that a force is applied to the opposing wall section 44 of the sun gear 4 and the inner peripheral wall 50 of the first holding member 5*a* to urge them to be displaced away from each other while interposing the restriction member 7 therebetween. The first holding member 5*a* receiving this force pushes the shaft 32 of at least one of the planetary gears 3*a* to 3*c* (in FIG. 3, the shaft 32 of the upper planetary gear 3*a*), radially outwardly with respect to the first plate 1 and the second plate 2. Thus, the gear portion 31 of the planetary gear 3*a* is pressed against the internal gear 12 of the first plate 1 and the internal gear 22 of the second plate 2, so that a gap corresponding to a backlash between the gear portion 31 of the planetary gear 3*a* and each of the internal gears 12, 22 of the first and second plates, 1, 2 is eliminated.

Concurrently, the sun gear 4 receiving the above force from the restriction member 7 acts to push the gear portions 31 of the remaining planetary gears other than the planetary gear 3*a* (in FIG. 3, the left lower and right lower planetary gears 3*b*, 3*c*), radially outwardly with respect to the first plate 1 and the second plate 2. Thus, each of the gear portions 31 of the planetary gears 3*b*, 3*c* is pressed against the internal gears 12, 22 of the first and second plates, 1, 2, so that a gap corresponding to a backlash between each of the gear portions 31 of the planetary gears 3b, 3c and a respective one of the internal gears 12, 22 of the first and second plates 1, 2 is eliminated.

In the above manner, each of the planetary gears 3a to 3c is pressed against the internal gears 12, 22 of the first and second plates 1, 2 (and thereby a gap between the planetary and internal gears is eliminated), so that the planetary gears 3a to 3c are precluded from being gradually rollingly displaced with respect to the internal gears 12, 22 of the first and second plates 1, 2 (i.e., a rotation of the first holding member 5a is restricted). Thus, even if a force in the rearward tilting direction R is repeatedly applied to the seat back 102, the planetary gears 3a to 3c and the first holding member 5a can be reliably maintained in a fixed state to effectively prevent the seat back 102 from being gradually moved in the rearward tilting direction R.

Further, for example, when a seat occupant tilts the seat back 102 rearwardly to an arbitrary angle on his/her own will, he/she grips and rotationally operates the manual operation dial 66 (see FIG. 2) in the specific direction X (in FIG. 3, the clockwise direction).

When the manual operation dial 66 is rotationally operated in the specific direction X, the sun gear operating member 6 is rotated in the same direction through the rotary shaft 65. According to this rotation, the restriction releasing convex portion 9 of the sun gear operating member 6 is brought into contact with the restriction member 7, as illustrated FIG. 9. Before rotationally operating the sun gear operating member 6, the sun gear operating member 6 is set to satisfy the aforementioned dimensional relation t1<t2 (see FIG. 7). Thus, at a timing in FIG. 9, the push-operation portion 61 of the sun gear operating member 6 (the first contact section 61a thereof) has not been brought into contact with the first pushable section 45a of the sun gear 4. That is, the restriction releasing convex portion 9 is adapted to be brought into contact with the restriction member 7 before the push-operation portion 61 is brought into contact with the first pushable section 45a. Subsequently, when the sun gear operating member 6 is further rotated, the restriction releasing concave portion 9 pushes the restriction member 7 against a biasing force of the biasing member 8 to displace the restriction member 7 in the specific direction X (i.e., a direction causing the width W of the wedge-shaped space 48 to become wider) within the wedge-shaped space 48.

In the above manner, the restriction member 7 is displaced in the specific direction X. As a result, the rotational restriction by the restriction member 7 is released, and the sun gear 4 becomes rotatable with respect to the first holding member 5a. When the sun gear operating member 6 is further rotated in the above restriction released state, the first contact section 61a of the push-operation portion 61 is brought into contact with the first pushable section 45a of the sun gear 4, as illustrated in FIG. 10.

Figure 10:
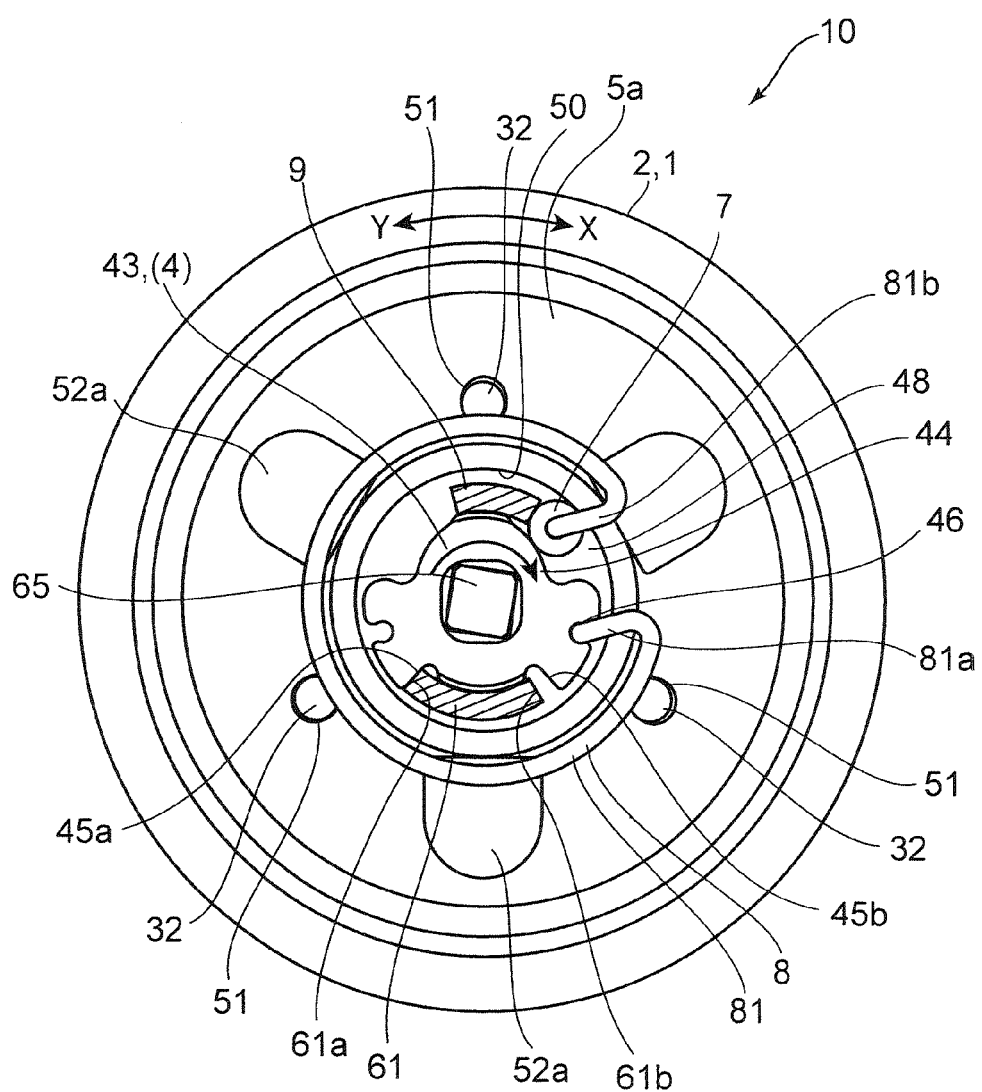
FIG. 10 is an explanatory view illustrating the positional relationship, in a state in which the sun gear operating member is further rotated from the state in FIG. 9.
Figure 11:
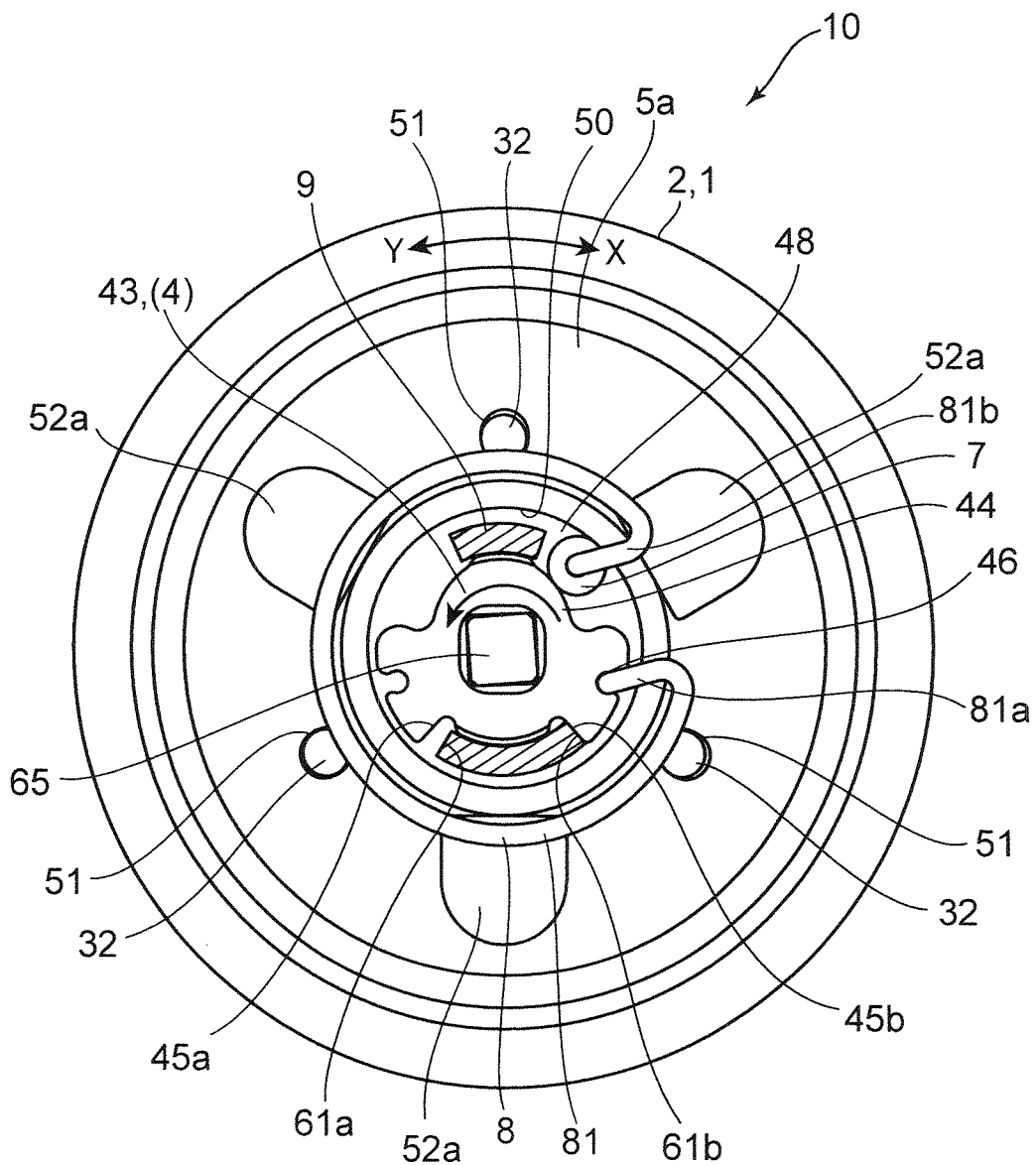
FIG. 11 is an explanatory view illustrating the positional relationship, in a state in which the sun gear operating member is rotated from the state in FIG. 10 in a counterclockwise direction.

When the sun gear operating member 6 is further rotated from the state in FIG. 10, the first contact section 61a of the push-operation portion 61 pushes the first pushable section 45a of the sun gear 4 in the specific direction X to rotate the sun gear 4 in the same direction, under the condition that the restriction released state is maintained.

In the above manner, the sun gear 4 is rotated in the specific direction X. Along with this rotation, each of the planetary gears 3a to 3c in meshing engagement with the sun gear 4 is rollingly displaced along the internal gears 12, 22 of the first and second plates 1, 2 (i.e., revolved around the sun gear 4 in the specific direction X while being rotated on its own axis). During the displacement, the first plate 1 is relatively rotated with respect to the second plate 2 in the specific direction X, because the number of teeth in the internal gear 12 of the first plate 1 is greater than the number of teeth in the internal gear 22 of the second plate 2, so that the seat back 102 will be displaced in the rearward tilting direction R.

On the other hand, when a seat occupant tilts the seat back 102 forwardly to an arbitrary angle, he/she grips and rotationally operates the manual operation dial 66 (see FIG. 2) in the counter direction Y which is opposite to the specific direction X (in FIG. 3, the counterclockwise direction).

When the manual operation dial 66 is rotationally operated in the counter direction Y, the sun gear operating member 6 is rotated in the same direction through the rotary shaft 65. According to this rotation, the push-operation portion 61 of the sun gear operating member 6 (the second contact section 61b thereof) is brought into contact with the second pushable section 45b of the sun gear 4, as illustrated FIG. 11. Then, when the sun gear operating member 6 is further rotated, the push-operation portion 61 pushes the second pushable section 45b of the sun gear 4 in the counter direction Y.

When the sun gear 4 is rotated according to the pushing, each of the planetary gears 3a to 3c in meshing engagement with the sun gear 4 is rollingly displaced along the internal gears 12, 22 of the first and second plates 1, 2. During the displacement, the first plate 1 is relatively rotated with respect to the second plate 2 in the counter direction Y, because the number of teeth in the internal gear 12 of the first plate 1 is greater than the number of teeth in the internal gear 22 of the second plate 2, so that the seat back 102 will be displaced in a forward tilting direction F.

According to the rotation of the sun gear 4 in the counter direction Y, the restriction member 7 in the wedge-shaped space 48 is relatively displaced in the specific direction X (i.e., a direction causing the width W of the wedge-shaped space 55 to become wider), so that the rotation of the sun gear 4 in the counter direction Y is never restricted.

<Second Embodiment>

With reference to FIGS. 12 to 21, a second embodiment of the present invention will be described below.

A reclining mechanism 110 according to the second embodiment comprises: a first plate 1; a second plate 2; a plurality of (in the second embodiment, three) planetary gears 3a to 3c; a sun gear 4; a first holding member 5a and a second holding member 5b which hold the planetary gears 3a to 3c; a sun gear operating member 6 for rotationally operating the sun gear 4; a first restriction member 7a and a second restriction member 7b for restricting respective rotations of the holding members 5a, 5b; and a biasing member 108 biasing the first and second restriction members 7a, 7b. Among the above components, the first plate 1, the second plate 2, the planetary gears 3a to 3c, and the first and second holding members 5a, 5b are structurally the same as those in the first embodiment, and their detailed description will be omitted here. The following description will be made mainly about the sun gear 4, the sun gear operating member 6, the first and second restriction members 7a, 7b and the biasing member 108, and about features different from those in the first embodiment.

Figure 12:
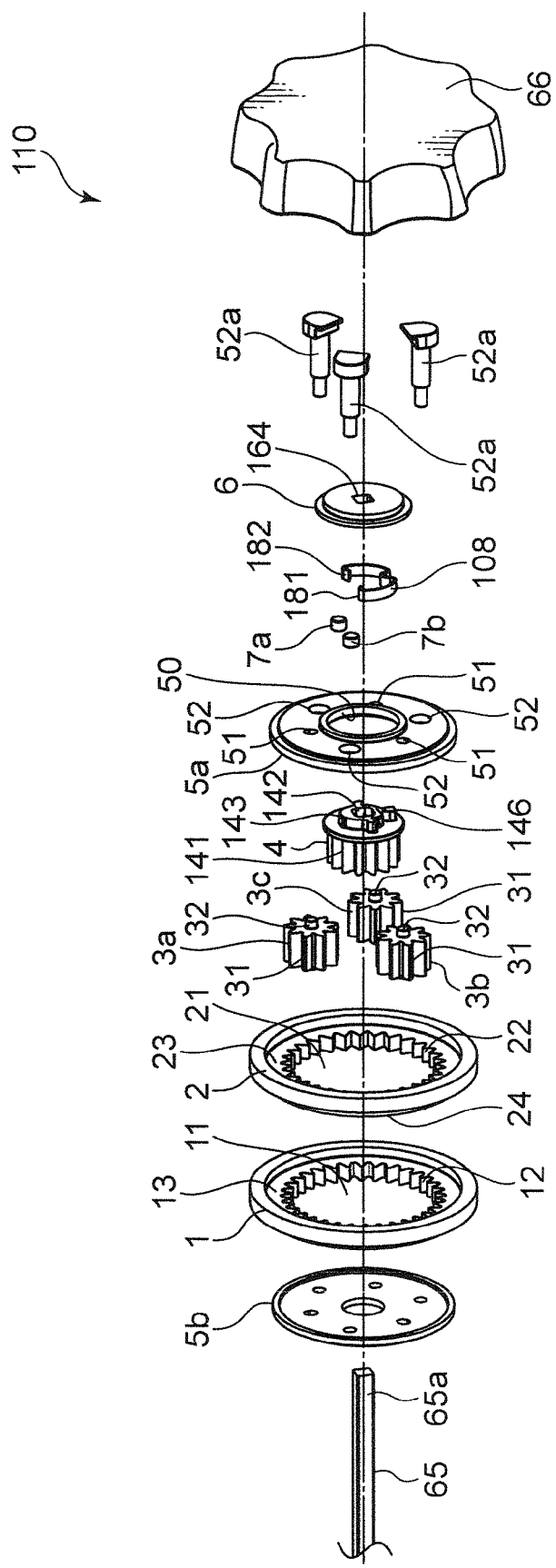
FIG. 12 is an exploded perspective view illustrating a structure of a substantial part of the reclining mechanism according to a second embodiment of the present invention.

The sun gear 4 will be described below. As illustrated in FIG. 12, the sun gear 4 has a gear portion 141, a convex portion 143 provided to protrude from the gear portion 141, and a locking protrusion 146 provided to protrude from the gear portion 141 to lock the biasing member 108. The gear portion 141 and the convex portion 143 are provided with a shaft insertion hole 142 penetrating through a central region thereof in an axial direction of the gear portion 141.

The gear portion 141 has a plurality of (in the second embodiment, sixteen) teeth provided in an outer periphery thereof and adapted to be in meshing engagement with the respective gear portions 31 of the planetary gears 3a to 3c.

Figure 13:
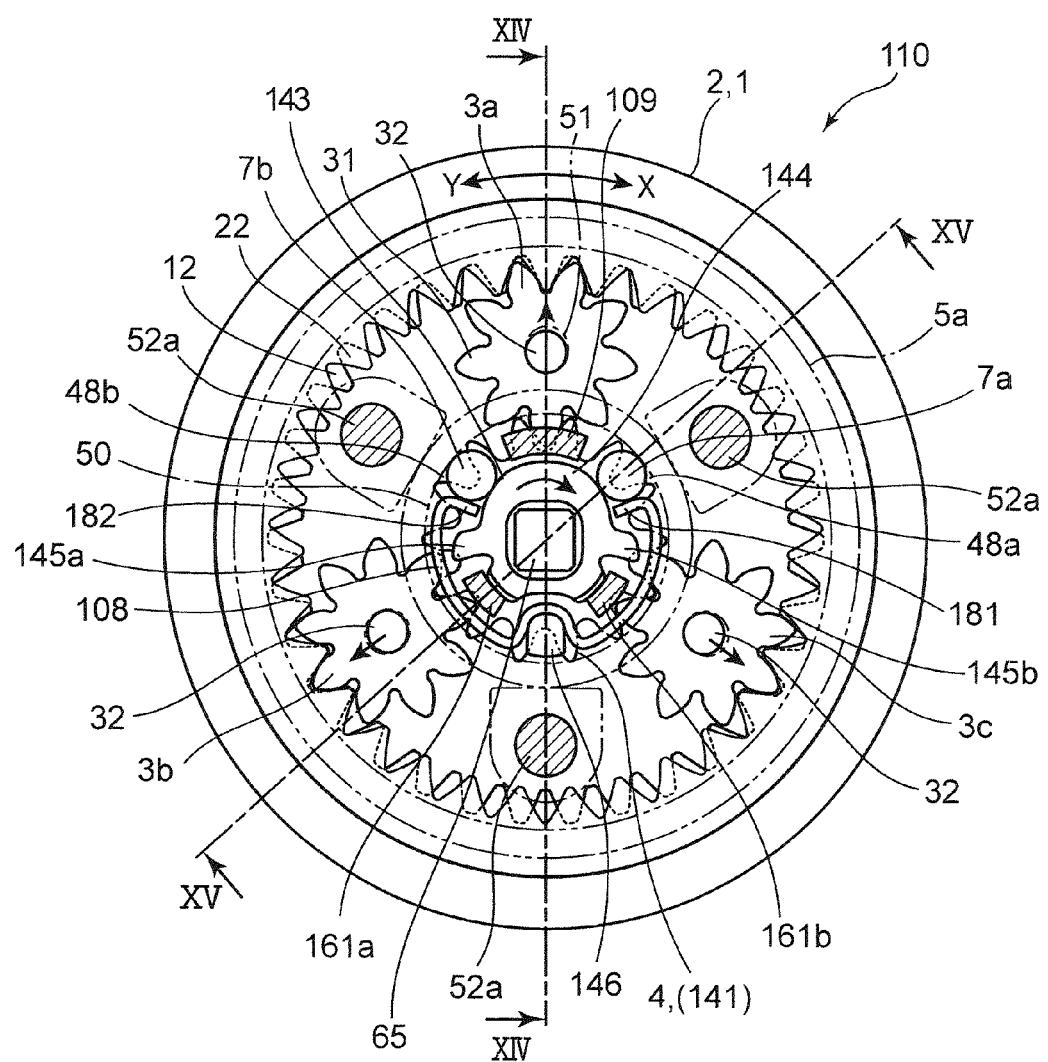
FIG. 13 is a plan view illustrating an internal structure of the reclining mechanism according to the second embodiment.
Figure 14:
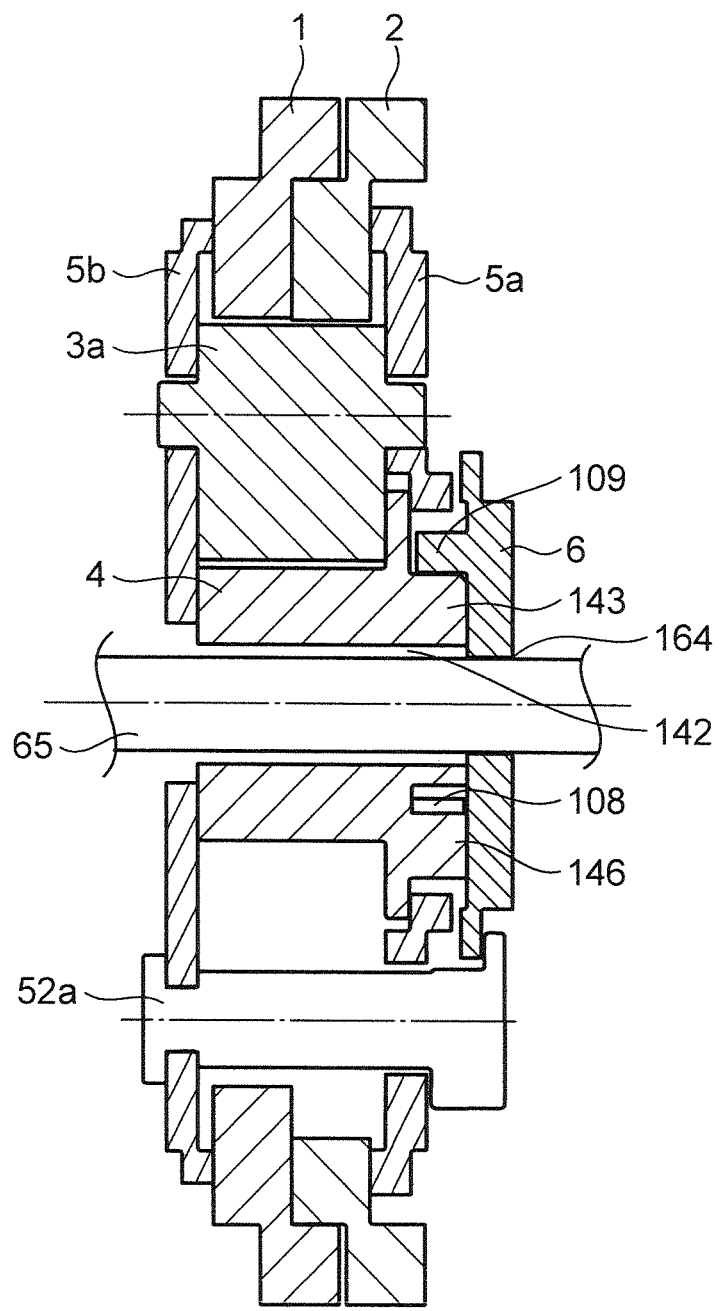
FIG. 14 is a sectional view taken along the line XIV-XIV in FIG. 13.
Figure 15:
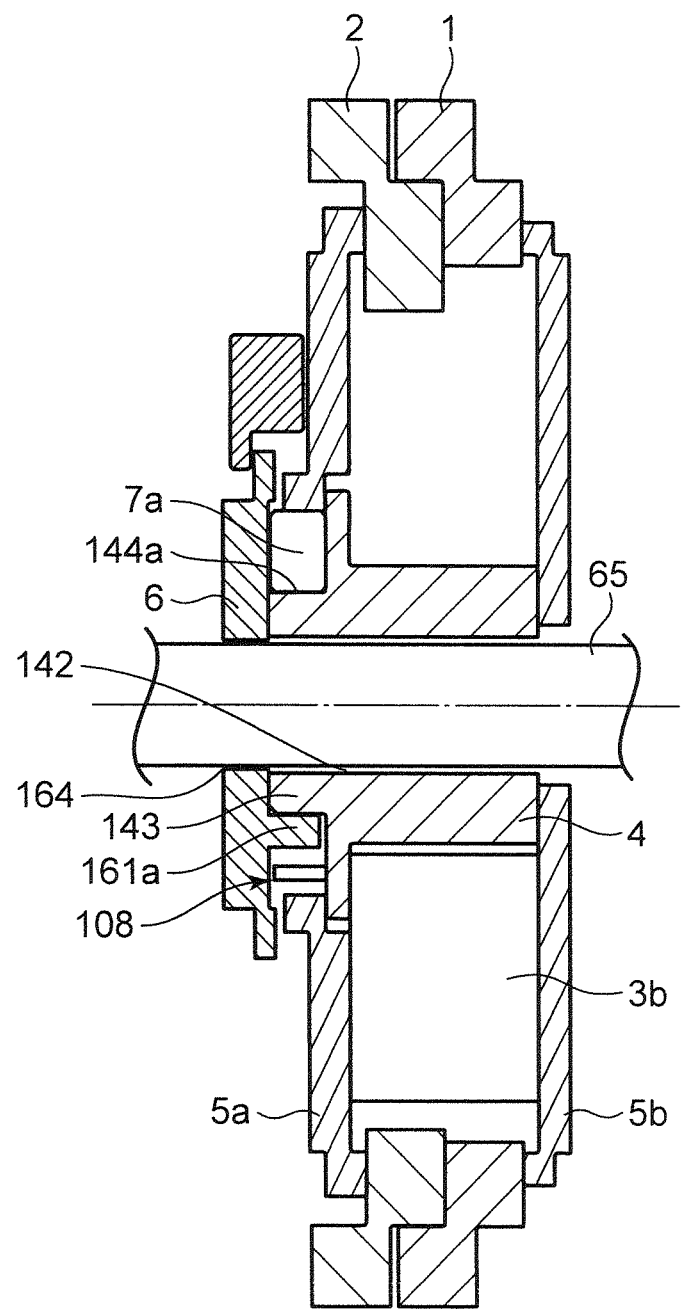
FIG. 15 is a sectional view taken along the line XV-XV in FIG. 13.

Then, as illustrated in FIGS. 13 to 15, the sun gear 4 is disposed between the first holding member 5a and the second holding member 5b in a coaxial relation to each other. The three planetary gears 3a to 3c are arranged around the sun gear 4 to surround the sun gear 4, and the gear portion 141 of the sun gear 4 and the gear portion 31 of each of the planetary gears 3a to 3c are brought into meshing engagement with each other. Thus, when the sun gear 4 is rotated, each of the planetary gears 3a to 3c is displaced (revolved) in the circumferential direction while being rotated about a shaft portion 32 thereof (rotated on its own axis), and the first and second holding members 5a, 5b are rotated.

Figure 17:
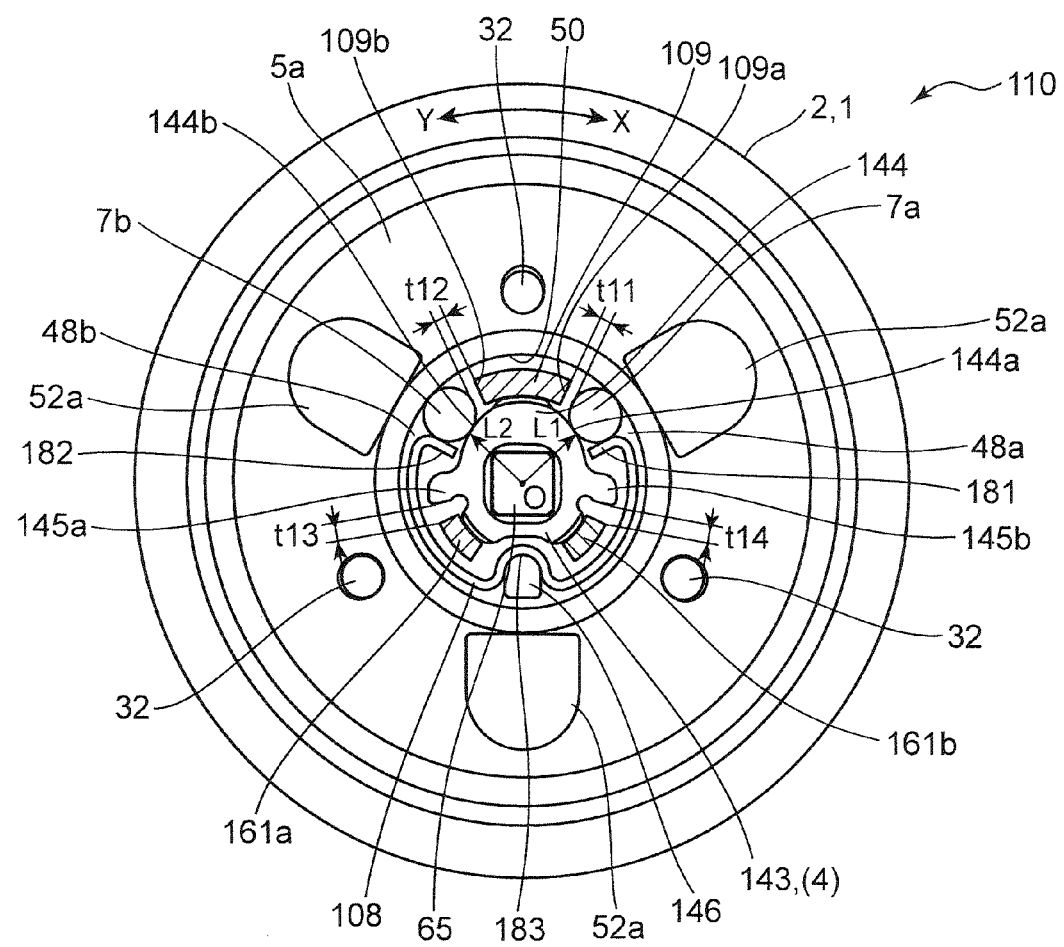
FIG. 17 is an explanatory view illustrating a positional relationship between a restriction member and a restriction releasing section each provided in the reclining mechanism according to the second embodiment.

The convex portion 143 of the sun gear 4 is formed such that a part of one lateral surface (in FIG. 12, a right surface) of the gear portion 141 is convexed in the axial direction by a predetermined distance, as a hollow raised segment surrounding the shaft insertion hole 142. As illustrated in FIG. 17, the convex portion 143 has: an opposing wall section 144 which defines an aftermentioned first wedge-shaped space 48a and an aftermentioned second wedge-shaped space 48b in cooperation with an inner peripheral wall 50 of the first holding member 5a; and a first pushable section 145a and a second pushable section 145b provided, respectively, on circumferentially opposite sides of the opposing wall section 144.

Figure 18:
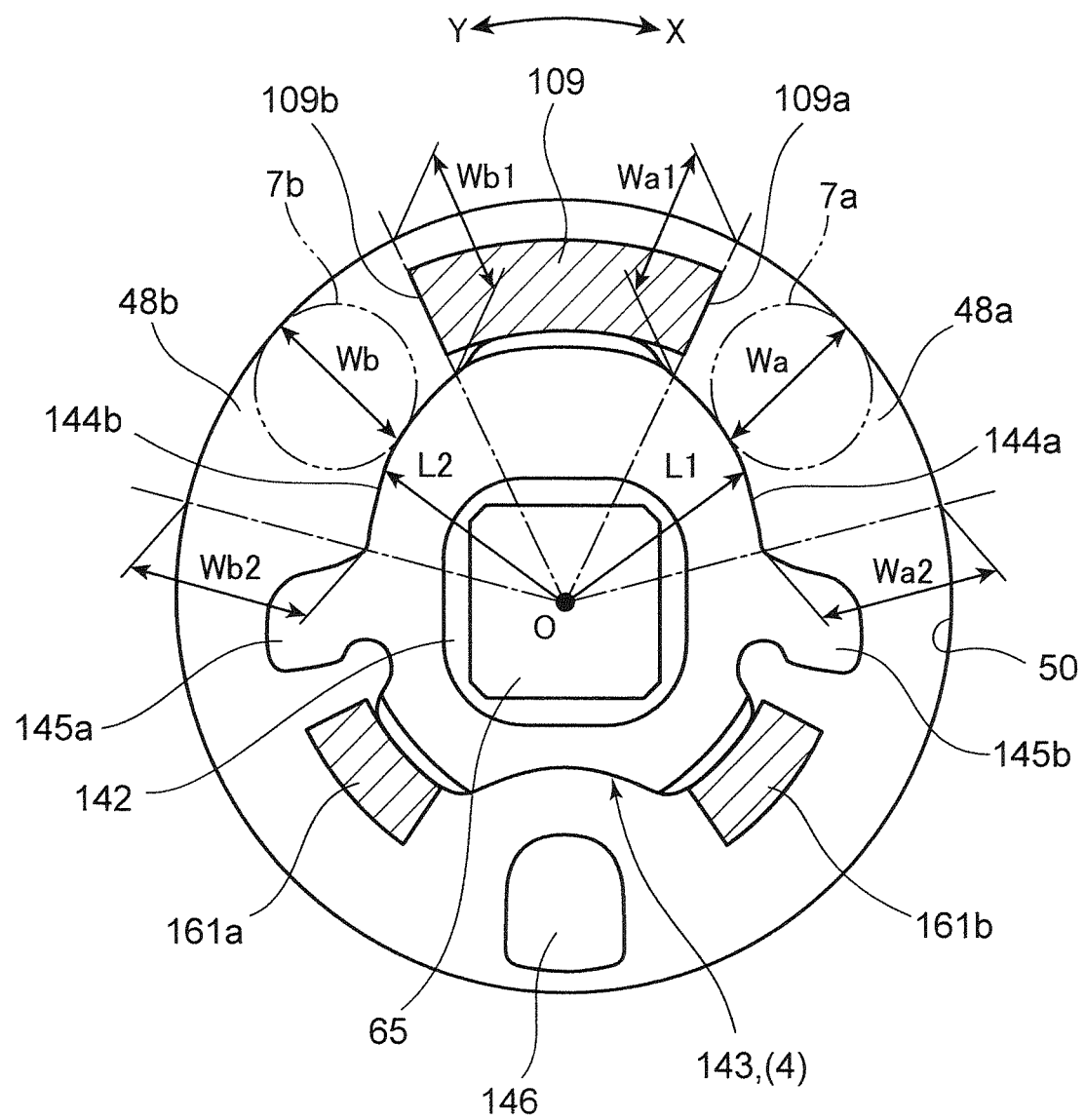
FIG. 18 is an explanatory view enlargedly illustrating shapes of first and second wedge-shaped spaces in FIG. 17.
Figure 19:
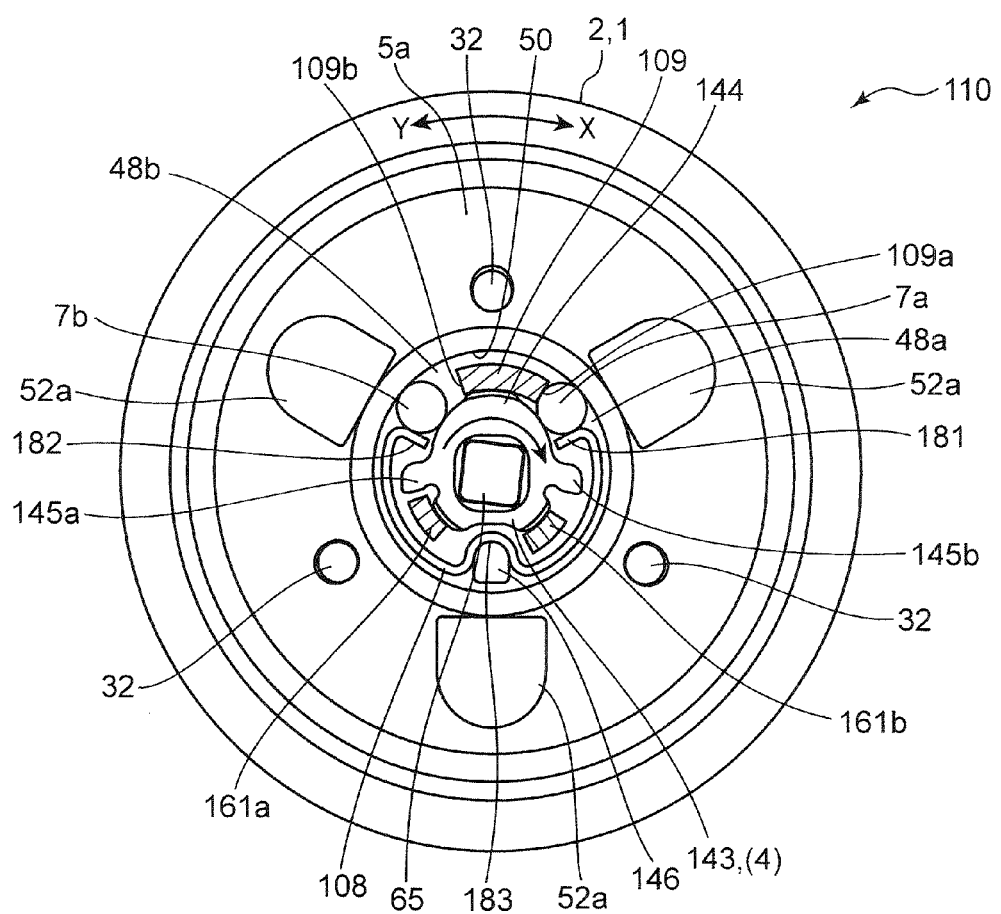
FIG. 19 is an explanatory view illustrating the positional relationship, in a state in which the sun gear operating member is rotated from the state in FIG. 17 in a clockwise direction.

FIG. 18 enlargedly illustrates a positional relationship between the opposing wall section 144 of the sun gear 4 and the inner peripheral wall 50 of the first holding member 5a. As also illustrated in FIG. 18, the opposing wall section 144 of the sun gear 4 is disposed to be opposed to the inner peripheral wall 50 of the first holding member 5a, while being radially spaced apart from each other.

Assuming that a direction along which the first plate 1 is urged to be rotated when a force in a rearward tilting direction R is applied to the seat back 102 (in FIG. 13, etc., a clockwise direction) will be referred to as "specific direction X", and a direction opposite to the specific direction (in FIG. 13, etc., a counterclockwise direction) will be referred to as "counter direction Y" as with the first embodiment, the opposing wall section 144 has a first wall surface region 144a on a leading side thereof with respect to the specific direction X, and a second wall surface region 144b on a leading side thereof with respect to the counter direction Y. In other words, a region of an outer peripheral surface of the opposing wall section 144 on a leading side with respect to the specific direction X is a first wall surface region 144a, and a region of the outer peripheral surface of the opposing wall section 144 on a leading side with respect to the counter direction Y is a second wall surface region 144b.

The first wall surface region 144a of the opposing wall section 144 is formed such that a distance L1 from a center O of the sun gear 4 gradually increases toward the counter direction Y. On the other hand, the second wall surface region 144b of the opposing wall section 144 is formed such that a distance L2 from the center O of the sun gear 4 gradually increases toward the specific direction X.

The first pushable section 145a and the second pushable section 145b are provides, respectively, at two circumferential positions of the convex portion 143 on both sides of the opposing wall section 144, to protrude radially from the convex portion 143. More specifically, the first pushable section 145a is provided at a position adjacent to a leading edge of the second wall surface region 144b of the opposing wall section 144 with respect to the counter direction Y, and the second pushable section 145b is provided at a position adjacent to a leading edge of the first wall surface region 144a of the opposing wall section 144 with respect to the specific direction X.

The locking protrusion 146 is formed such that a part of the one lateral surface (in FIG. 12, the right surface) of the gear portion 141 is convexed by approximately the same distance as that of the convex portion 143, and provided at a position radially spaced apart from the convex portion 143 by a predetermined distance (in FIG. 17, on a lower side of the convex portion 143).

As illustrated in FIGS. 13, 17 and 18, the first wall surface region 144a of the opposing wall section 144 of the sun gear 4 and the inner peripheral wall 50 of the first holding member 5a define therebetween a first wedge-shaped space 48a, and the first restriction member 7a is displaceably disposed in the first wedge-shaped space 48a. Further, the second wall surface region 144b of the opposing wall section 144 of the sun gear 4 and the inner peripheral wall 50 of the first holding member 5a define therebetween a second wedge-shaped space 48b, and the second restriction member 7b is displaceably disposed in the second wedge-shaped space 48b.

A width Wa (see FIG. 18) of the first wedge-shaped space 48a is set to gradually become narrowed toward the counter direction Y, according to the aforementioned shape of the first wall surface region 144a of the opposing wall section 144. Specifically, because the distance L1 of the first wall surface region 144a from the center O of the sun gear 4 gradually increases toward the counter direction Y, a radial distance (clearance) between the first wall surface region 144a and the inner peripheral wall 50 of the first holding member 5a, i.e., a value of the width Wa of the first wedge-shaped space 48a, gradually decreases toward the counter direction Y.

On the other hand, a width Wb (see FIG. 18) of the second wedge-shaped space 48b is set to gradually become narrowed toward the specific direction X, according to the aforementioned shape of the second wall surface region 144b of the opposing wall section 144. Specifically, because the distance L2 of the second wall surface region 144b from the center O of the sun gear 4 gradually increases toward the specific direction X, a radial distance (clearance) between the second wall surface region 144b and the inner peripheral wall 50 of the first holding member 5a, i.e., a value of the width Wb of the second wedge-shaped space 48b, gradually decreases toward the specific direction X.

Figure 16:
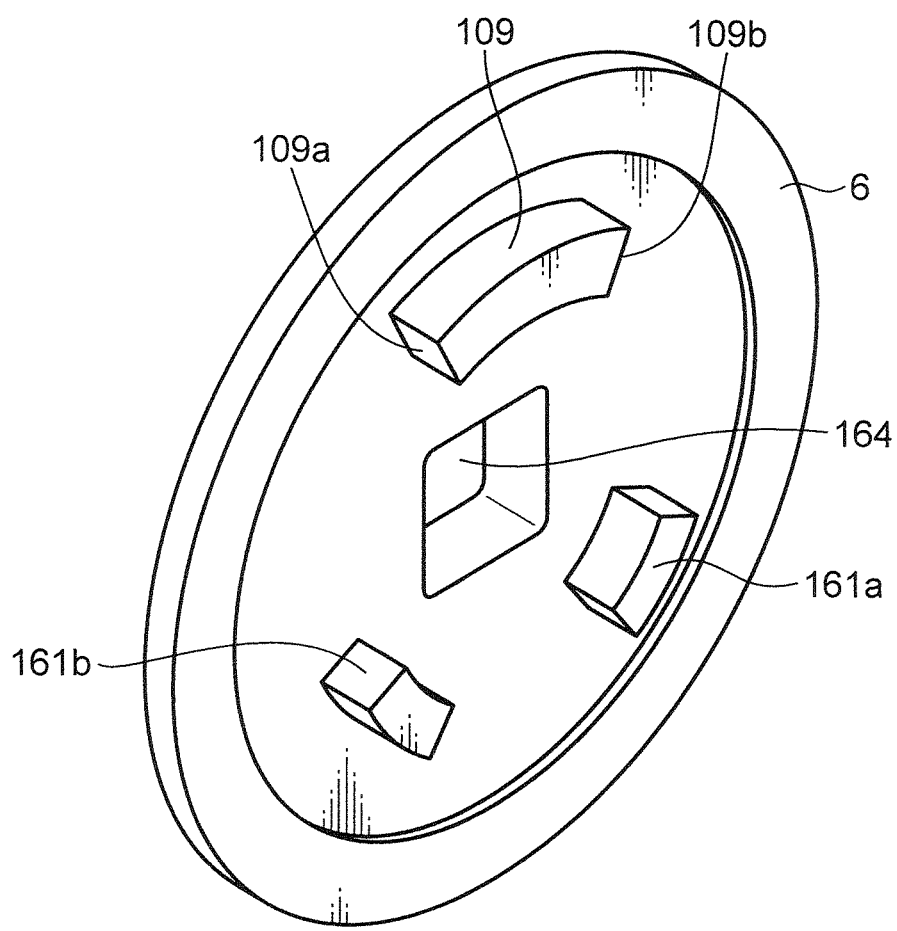
FIG. 16 is a perspective view separately illustrating a sun gear operating member provided in the reclining mechanism according to the second embodiment.

The sun gear operating member 6 will be described below. As illustrated in FIG. 12, the sun gear operating member 6 is composed of a circular disk-shaped plate. More specifically, as illustrated in FIG. 16, the sun gear operating member 6 integrally has: a first push-operation portion 161a and a second push-operation portion 161b protrudingly provided, respectively, at two positions on a lower region of a lateral surface thereof on the side of the first holding member 5a and the sun gear 4 (in FIG. 12, a left surface); and a restriction releasing convex portion 109 protrudingly provided on an upper region of the lateral surface. Further, a quadrangular-shaped shaft coupling hole 164 is provided in a central region of the sun gear operating member 6 located between the first and second push-operation portions 161a, 161b, and the restriction releasing convex portion 109.

The first push-operation portion 161a is a member for pushing and rotating the sun gear 4 in the specific direction X, and formed to protrude from the lateral surface of the sun gear operating member 6 on the side of the sun gear 4, by a predetermined distance, and extend for a short distance in an arc pattern along a circumferential direction of the sun gear operating member 6.

The second push-operation portion 161b is a member for pushing and rotating the sun gear 4 in the counter direction Y, and formed to protrude from the lateral surface of the sun gear operating member 6 on the side of the sun gear 4, by a predetermined distance, and extend for a short distance in an arc pattern along the circumferential direction of the sun gear operating member 6.

The restriction releasing convex portion 109 is a member for releasing respective restrictions by the first and second restriction members 7a, 7b, and formed to protrude from the lateral surface of the sun gear operating member 6 on the side of the sun gear 4, by a predetermined distance, and extend in an arc pattern along the circumferential direction of the sun gear operating member 6.

The restriction releasing convex portion 109 has a first restriction releasing section 109a provided at one of opposite ends thereof (an end on a leading side with respect to the specific direction X) in the circumferential direction of the sun gear operating member 6 to release a restriction by the first restriction member 7a, and a second restriction releasing section 109b provided at the other end (an end on a leading side with respect to the counter direction Y) in the circumferential direction of the sun gear operating member 6 to release a restriction by the second restriction member 7b.

As illustrated in FIGS. 13 and 17, the restriction releasing convex portion 109 is disposed in a gap between the inner peripheral wall 50 of the first holding member 5a and the convex portion 143 of the sun gear 4, at a position between the first restriction member 7a and the second restriction member 7b, in a circumferentially displaceable manner. Thus, the first restriction releasing section 109a is located opposed to the first restriction member 7a, and the second restriction releasing section 109b is located opposed to the second restriction member 7b.

As illustrated in FIG. 17, a gap t11 defined between the first restriction releasing section 109a of the restriction releasing convex portion 109 and the first restriction member 7a is set to become less than a gap t13 defined between the first push-operation portion 161a of the sun gear operating member 6 and the first pushable section 145a of the sun gear 4.

Further, a gap t12 defined between the second restriction releasing section 109b of the restriction releasing convex portion 109 and the second restriction member 7b is set to become less than a gap t14 defined between the second push-operation portion 161b of the sun gear operating member 6 and the second pushable section 145b of the sun gear 4.

The sun gear operating member 6 configured as above is non-rotatably coupled to a manual operation dial 66 through an aftermentioned rotary shaft 65.

Specifically, a square pillar-shaped rotary shaft 65 is disposed in a coupling portion between the seat back 102 and the seat cushion 101 of the seat 100 (see FIG. 1), rotatably with respect to the seat back 102 and a seat cushion 101. As illustrated in FIG. 12, the rotary shaft 65 has a first end 65a which is rotatably inserted into the second holding member 5b, a circular hole 11 of the first plate 1, a circular hole 21 of the second plate 2, the shaft insertion hole 142 of the sun gear 4, and the first holding member 5a, in this order. Further, the first end 65a of the rotary shaft 65 inserted in the above members is non-rotatably fitted into the shaft coupling hole 164 of the sun gear operating member 6. Thus, the rotary shaft 65 is disposed in a freely relatively rotatable manner with respect to the second holding member 5b, the first plate 1, the second plate 2, the sun gear 4 and the first holding member 5a, and in a relatively non-rotatable manner with respect to the sun gear operating member 6.

The first end 65a of the rotary shaft 65 fitted in the shaft coupling hole 164 of the sun gear operating member 6 is further coupled to the manual operation dial 66 illustrated in FIG. 12, in a relatively non-rotatable manner. Therefore, according to rotation of the manual operation dial 66, the rotary shaft 65 is rotated, and, according to this rotation, the sun gear operating member 6 is rotated.

The first and second restriction members 7a, 7b will be described below. The first restriction member 7a is designed to restrict the first and second holding members 5a, 5b from being rotated with respect to the sun gear 4 in the specific direction X, and disposed within the first wedge-shaped space 48a. On the other hand, the second restriction member 7b is designed to restrict the first and second holding members 5a, 5b from being rotated with respect to the sun gear 4 in the counter direction Y, and disposed within the second wedge-shaped space 48b.

In the second embodiment, the first restriction member 7a is composed of a columnar-shaped roller. An outer diameter of the first restriction member 7a is set to be less than a width (maximum width) Wa2 of an end of the first wedge-shaped space 48a on a leading side with respect to the specific direction X, and greater than a width (minimum width) Wa1 of an end of the first wedge-shaped space 48a on a leading side with respect to the counter direction Y.

The second restriction member 7b has the same configuration as that of the first restriction member 7a, and an outer diameter of the second restriction member 7b is set to be less than a width (maximum width) Wb2 of an end of the second wedge-shaped space 48b on a leading side with respect to the counter direction Y, and greater than a width (minimum width) Wb1 of an end of the second wedge-shaped space 48b on a leading side with respect to the specific direction X.

The biasing member 108 will be described below. As illustrated in FIGS. 12, 13 and 17, the biasing member 108 is composed of an open ring-shaped member which has one end provided with a first-restriction-member pushing portion 181 for pushing the first restriction member 7a, and the other end provided with a second-restriction-member pushing portion 182 for pushing the second restriction member 7b.

Further, an intermediate portion of the biasing member 108 between the first-restriction-member pushing portion 181 and the second-restriction-member pushing portion 182 is formed as an engagement concavely-curved portion 183 adapted to be locked to the locking protrusion 146 of the sun gear 4.

The biasing member 108 configured as above is disposed in the gap between the convex portion 143 of the sun gear 4 and the inner peripheral wall 50 of the first holding member 5a, in a state in which the engagement concavely-curved portion 183 is locked to the locking protrusion 146 of the sun gear 4.

In this state, the first-restriction-member pushing portion 181 of the biasing member 108 is located in contact with the first restriction member 7a within the first wedge-shaped space 48a to bias the first restriction member 7a toward the counter direction Y.

Concurrently, the second-restriction-member pushing portion 182 of the biasing member 108 is located in contact with the second restriction member 7b within the second wedge-shaped space 48b to bias the second restriction member 7b toward the specific direction X.

An operation of the reclining mechanism 110 configured as above will described below.

When a force in the rearward tilting direction R as illustrated in FIG. 1 is applied to the seat back 102 of the seat 100 incorporating the reclining mechanism 110, a rotational force in the specific direction X is applied to the first plate 1 according to the force in the rearward tilting direction R, and transmitted to the sun gear 4 via the planetary gears 3a to 3c, as a force urging the sun gear 4 to be rotated in the specific direction X. This is equivalent to pushing the first restriction member 7a toward the counter direction Y in the first wedge-shaped space 48a defined between the first wall surface region 144a of the opposing wall section 144 of the sun gear 4 and the inner peripheral wall 50 of the first holding member 5a. Particularly, in the second embodiment, the first restriction member 7a is biased in the counter direction Y by the first-restriction-member pushing portion 181 of the biasing member 108, so that the first restriction member 7a is reliably pushed toward the counter direction Y without being displaced in the specific direction X in conjunction with the above movement.

When the first restriction member 7a is relatively pushed toward the counter direction Y (i.e., in a direction causing the width of the first wedge-shaped space 48a to become narrower), the first restriction member 7a is brought into such a situation that it bites into a narrow region of the first wedge-shaped space 48a, so that a force is applied to the opposing wall section 144 of the sun gear 4 and the inner peripheral wall 50 of the first holding member 5a to urge them to be displaced away from each other while interposing the first restriction member 7a therebetween. The first holding member 5a and the sun gear 4 receiving this force act to press the planetary gears 3a to 3c against the internal gears 12, 22 of the first and second plates 1, 2, so that a gap corresponding to a backlash between each of the gear portions 31 of the planetary gears 3a to 3c and a respective one of the internal gears 12, 22 of the first and second plates 1, 2 is eliminated.

In the above manner, a gap between the planetary and internal gears is eliminated, so that the planetary gears 3a to 3c are precluded from being gradually rollingly displaced with respect to the internal gears 12, 22 of the first and second plates 1, 2 (i.e., a rotation of the first holding member 5a is restricted). Thus, even if a force in the rearward tilting direction R is repeatedly applied to the seat back 102, the planetary gears 3a to 3c and the first holding member 5a can be reliably maintained in a fixed state to effectively prevent the seat back 102 from being gradually moved in the rearward tilting direction R.

On the other hand, when a force in the forward tilting direction F as illustrated in FIG. 1 is applied to the seat back 102, a rotational force in the counter direction Y is applied to the first plate 1 according to the force in the forward tilting direction F, and transmitted to the sun gear 4 via the planetary gears 3a to 3c, as a force urging the sun gear 4 to be rotated in the counter direction Y. This is equivalent to pushing the second restriction member 7b toward the specific direction X in the second wedge-shaped space 48b defined between the second wall surface region 144b of the opposing wall section 144 of the sun gear 4 and the inner peripheral wall 50 of the first holding member 5a. Particularly, in the second embodiment, the second restriction member 7b is biased in the specific direction X by the second-restriction-member pushing portion 182 of the biasing member 108, so that the second restriction member 7b is reliably pushed toward the specific direction X without being displaced in the counter direction Y in conjunction with the above movement.

When the second restriction member 7b is relatively pushed toward the specific direction X (i.e., in a direction causing the width of the second wedge-shaped space 48b to become narrower), the second restriction member 7b is brought into such a situation that it bites into a narrow region of the second wedge-shaped space 48b, so that a force is applied to the opposing wall section 144 of the sun gear 4 and the inner peripheral wall 50 of the first holding member 5a to urge them to be displaced away from each other while interposing the second restriction member 7b therebetween. The first holding member 5a and the sun gear 4 receiving this force act to press the planetary gears 3a to 3c against the internal gears 12, 22 of the first and second plates 1, 2, so that a gap corresponding to a backlash between each of the gear portions 31 of the planetary gears 3a to 3c and a respective one of the internal gears 12, 22 of the first and second plates 1, 2 is eliminated.

In the above manner, a gap between the planetary and internal gears is eliminated, so that the planetary gears 3a to 3c are precluded from being gradually rollingly displaced with respect to the internal gears 12, 22 of the first and second plates 1, 2 (i.e., a rotation of the first holding member 5a is restricted). Thus, even if a force in the forward tilting direction F is repeatedly applied to the seat back 102, the planetary gears 3a to 3c and the first holding member 5a can be reliably maintained in a fixed state to effectively prevent the seat back 102 from being gradually moved in the forward tilting direction F.

An operation of the reclining mechanism 110 in the case where the seat back 102 is moved according to the will of a seat occupant will be described below.

When a seat occupant tilts the seat back 102 rearwardly to an arbitrary angle on his/her own will, he/she grips and rotationally operates the manual operation dial 66 (see FIG. 12) in the specific direction X (in FIG. 13, the clockwise direction).

When the manual operation dial 66 is rotationally operated in the specific direction X, the sun gear operating member 6 is rotated in the same direction through the rotary shaft 65. According this rotation, the first restriction releasing section 109a of the restriction releasing convex portion 109 of the sun gear operating member 6 is brought into contact with the first restriction member 7a, as illustrated FIG. 19. Before rotationally operating the sun gear operating member 6, the sun gear operating member 6 is set to satisfy the aforementioned dimensional relation t11<t13 (see FIG. 17). Thus, at a timing in FIG. 19, the first push-operation portion 161a of the sun gear operating member 6 has not been brought into contact with the first pushable section 145a of the sun gear 4. That is, the first restriction releasing section 109a of the restriction releasing convex portion 109 is adapted to be brought into contact with the first restriction member 7a before the first push-operation portion 161a is brought into contact with the first pushable section 145a. Subsequently, when the sun gear operating member 6 is further rotated, the first restriction releasing section 109a of the restriction releasing convex portion 109 pushes the first restriction member 7a against a biasing force of the biasing member 108 to displace the first restriction member 7a in the specific direction X (i.e., a direction causing the width Wa of the first wedge-shaped space 48a to become wider) within the first wedge-shaped space 48a.

In the above manner, the first restriction member 7a is displaced in the specific direction X. As a result, the rotational restriction by the first restriction member 7a is released, and the sun gear 4 becomes rotatable with respect to the first holding member 5a. When the sun gear operating member 6 is further rotated in the above restriction released state, the first push-operation portion 161a is brought into contact with the first pushable section 145a of the sun gear 4, as illustrated in FIG. 20.

Figure 20:
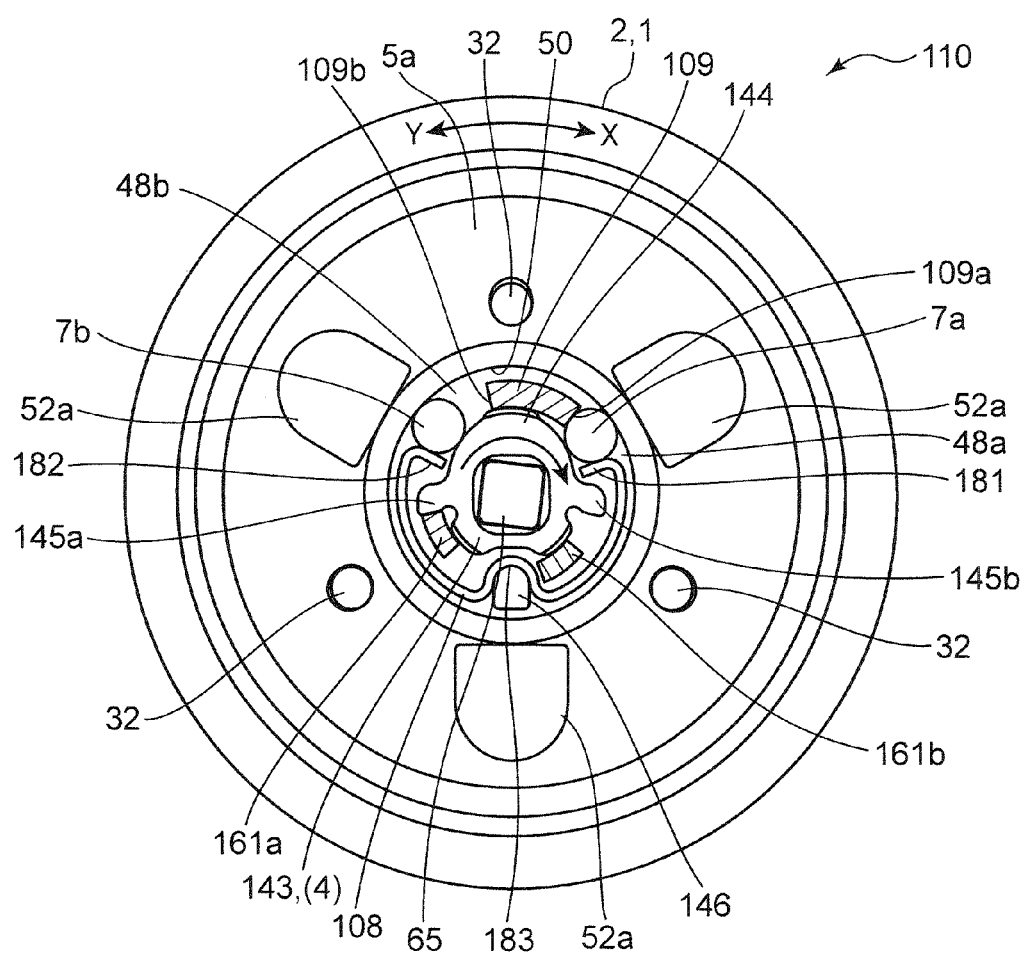
FIG. 20 is an explanatory view illustrating the positional relationship, in a state in which the sun gear operating member is further rotated from the state in FIG. 19.
Figure 21:
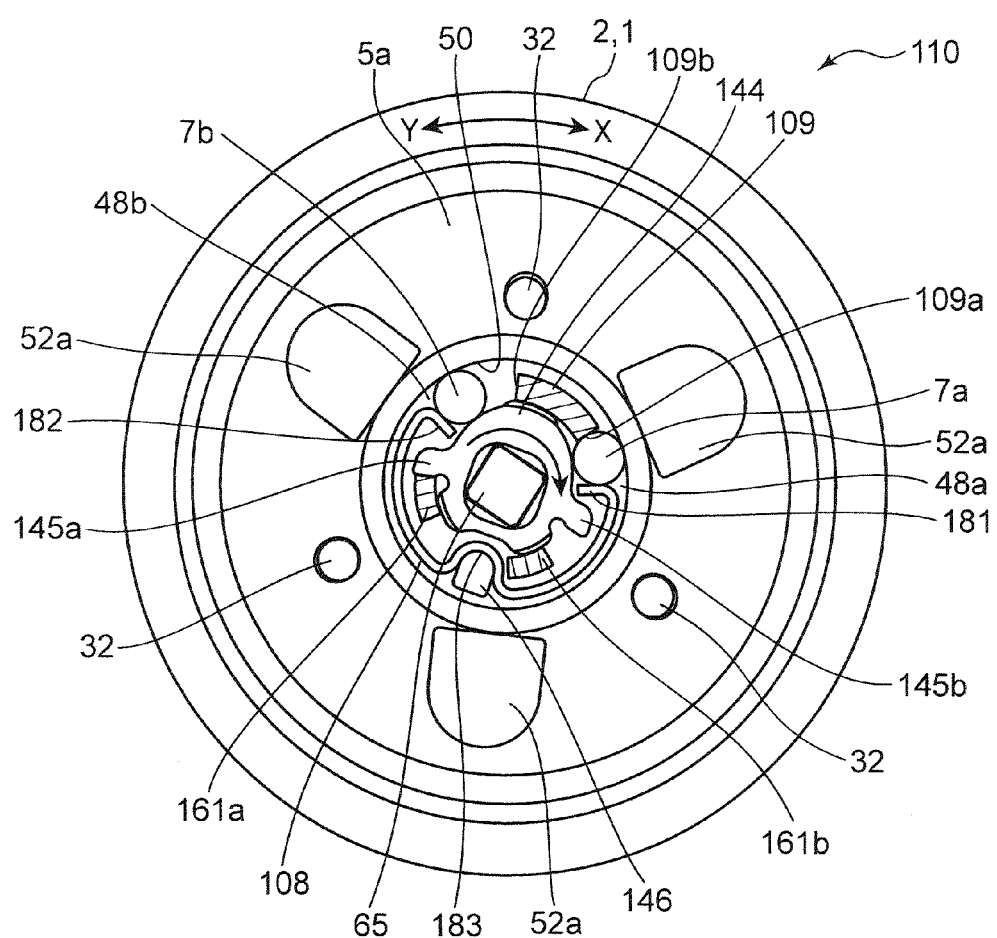
FIG. 21 is an explanatory view illustrating the positional relationship, in a state in which the sun gear operating member is further rotated from the state in FIG. 20.

When the sun gear operating member 6 is further rotated from the state in FIG. 20, the first push-operation portion 161a pushes the first pushable section 145a of the sun gear 4 in the specific direction X to rotate the sun gear 4 in the same direction, under the condition that the restriction released state is maintained.

In the above manner, the sun gear 4 is rotated in the specific direction X. Along with this rotation, each of the planetary gears 3a to 3c in meshing engagement with the sun gear 4 is rollingly displaced along the internal gears 12, 22 of the first and second plates 1, 2 (i.e., revolved around the sun gear 4 in the specific direction X while being rotated on its own axis). During the displacement, the first plate 1 is relatively rotated with respect to the second plate 2 in the specific direction X, because the number of teeth in the internal gear 12 of the first plate 1 is greater than the number of teeth in the internal gear 22 of the second plate 2, so that the seat back 102 will be displaced in the rearward tilting direction R.

In the above operation, according to the rotation of the sun gear 4 in the specific direction X, the second restriction member 7b in the second wedge-shaped space 48b is relatively displaced in the counter direction Y (i.e., a direction causing the width Wb of the second wedge-shaped space 48b to become wider), so that the rotation of the sun gear 4 in the specific direction X is never restricted.

On the other hand, when a seat occupant tilts the seat back 102 forwardly to an arbitrary angle, he/she grips and rotationally operates the manual operation dial 66 (see FIG. 12) in the counter direction Y which is opposite to the specific direction X (in FIG. 13, the counterclockwise direction).

When the manual operation dial 66 is rotationally operated in the counter direction Y, the sun gear operating member 6 is rotated in the same direction through the rotary shaft 65. According this rotation, the second restriction releasing section 109b of the restriction releasing convex portion 109 of the sun gear operating member 6 is brought into contact with the second restriction member 7b, although not illustrated. Before rotationally operating the sun gear operating member 6, the sun gear operating member 6 is set to satisfy the aforementioned dimensional relation t12<t14 (see FIG. 17). Thus, at this timing, the second push-operation portion 161b of the sun gear operating member 6 has not been brought into contact with the second pushable section 145b of the sun gear 4. That is, the second restriction releasing section 109b of the restriction releasing convex portion 109 is adapted to be brought into contact with the second restriction member 7b before the second push-operation portion 161b is brought into contact with the second pushable section 145b. Subsequently, when the sun gear operating member 6 is further rotated, the second restriction releasing section 109b of the restriction releasing convex portion 109 pushes the second restriction member 7b against a biasing force of the biasing member 108 to displace the second restriction member 7b in the counter direction Y (i.e., a direction causing the width Wb of the second wedge-shaped space 48b to become wider) within the second wedge-shaped space 48b.

In the above manner, the second restriction member 7b is displaced in the counter direction Y. As a result, the rotational restriction by the second restriction member 7b is released, and the sun gear 4 becomes rotatable with respect to the first holding member 5a. When the sun gear operating member 6 is further rotated in the above restriction released state, the second push-operation portion 161b is brought into contact with the second pushable section 145b of the sun gear 4.

When the sun gear operating member 6 is further rotated from this state, the second push-operation portion 161b pushes the second pushable section 145b of the sun gear 4 in the counter direction Y to rotate the sun gear 4 in the same direction, under the condition that the restriction released state is maintained.

In the above manner, the sun gear 4 is rotated in the counter direction Y. Along with this rotation, each of the planetary gears 3a to 3c in meshing engagement with the sun gear 4 is rollingly displaced along the internal gears 12, 22 of the first and second plates 1, 2 (i.e., revolved around the sun gear 4 in the counter direction Y while being rotated on its own axis). During the displacement, the first plate 1 is relatively rotated with respect to the second plate 2 in the counter direction Y, because the number of teeth in the internal gear 12 of the first plate 1 is greater than the number of teeth in the internal gear 22 of the second plate 2, so that the seat back 102 will be displaced in the forward tilting direction F.

In the above operation, according to the rotation of the sun gear 4 in the counter direction Y, the first restriction member 7a in the first wedge-shaped space 48a is relatively displaced in the specific direction X (i.e., a direction causing the width Wa of the first wedge-shaped space 48a to become wider), so that the rotation of the sun gear 4 in the counter direction Y is never restricted.

Although the first and second embodiments have been described as examples of a preferred embodiment of the present invention, the present invention is not limited to only the first and second embodiments but various changes and modifications may be made therein. For example, in the above embodiments, the reclining mechanism of the present invention has been applied to an automobile seat. However, the present invention may also be applied to a seat for various other apparatuses, such as trains and airplanes.

At the end of the description, distinctive features of the reclining mechanism disclosed in the above embodiments and functions/advantageous effects based on the features will be outlined below.

The reclining mechanism comprises: a ring-shaped first plate fixed to a seat back; a ring-shaped second plate capable of rotating with respect to the first plate and fixed to a seat cushion; a plurality of planetary gears in meshing engagement with internal gears provided in respective inner peripheries of the first plate and the second plate; a sun gear in meshing engagement with the planetary gears; a holding member rotatably holding the planetary gears and having an inner peripheral wall surrounding the sun gear; and a restriction member for restricting a rotation of the holding member with respect to the sun gear. The sun gear has an opposing wall section opposed to the inner peripheral wall of the holding member. The opposing wall section of the sun gear and the inner peripheral wall of the holding member define therebetween a wedge-shaped space in which the restriction member is displaceably disposed. The opposing wall section of the sun gear is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

In the reclining mechanism having the above basic feature, when a force in a rearward tilting direction is applied to the seat back, a rotational force in the specific direction is applied to the first plate and transmitted to the sun gear via the planetary gears, as a force urging the sun gear to be rotated in the specific direction. This is equivalent to pushing the restriction member toward the counter direction in the wedge-shaped space defined between the opposing wall section of the sun gear and the inner peripheral wall of the holding member.

When the restriction member is pushed toward the counter direction (i.e., in a direction causing a width of the wedge-shaped space to become narrower), the restriction member is brought into such a situation that it bites into a narrow region of the wedge-shaped space, so that a force is applied to the opposing wall section of the sun gear and the inner peripheral wall of the holding member to be displaced away from each other while interposing the restriction member therebetween. The holding member receiving this force acts to press at least a specific one of the planetary gears against the internal gears of the first and second plates, so that a gap which would otherwise occur between the specific planetary gear and each of the internal gears of the first and second plates is eliminated. Concurrently, the sun gear receiving the above force acts to press each of the gear portions of the remaining planetary gears against the internal gears of the first and second plates, so that a gap which would otherwise occur between each of the remaining planetary gears and a respective one of the internal gears of the first and second plates is eliminated.

In the above manner, each of the planetary gears is pressed against the internal gears of the first and second plates (and thereby a gap between the planetary and internal gears is eliminated), so that the planetary gears are precluded from being gradually rollingly displaced with respect to the internal gears of the first and second plates (i.e., a rotation of the holding member is restricted). Thus, even if a force in the rearward tilting direction is repeatedly applied to the seat back, the planetary gears and the holding member can be reliably maintained in a fixed state to effectively prevent the seat back from being gradually moved in the rearward tilting direction.

Preferably, the above reclining mechanism further comprises a biasing member biasing the restriction member disposed in the wedge-shaped space, in the counter direction.

According to this feature, it becomes possible to prevent the restriction member from being displaced in the specific direction in conjunction with a movement of the holding member. Thus, when a force in the rearward tilting direction is applied to the seat back, the restriction member can be reliably pushed toward the counter direction (in a direction causing the width of the wedge-shaped space to become narrower) so as to maintain the seat back in a fixed state.

More preferably, the reclining mechanism having the above feature further comprises a sun gear operating member for rotationally operating the sun gear. The sun gear operating member has a restriction releasing convex portion for releasing the restriction by the restriction member. The restriction releasing convex portion pushes, according to a movement of the sun gear operating member for rotationally operating the sun gear in the specific direction, the restriction member against a biasing force of the biasing member to displace the restriction member in the specific direction within the wedge-shaped space.

According to this feature, when a seat occupant operates the sun gear operating member in order to displace the seat back in the rearward tilting direction, the restriction releasing convex portion is operable to push and displace the restriction member toward the specific direction (in a direction causing the width of the wedge-shaped space to become wider) according to a rotation of the sun gear operating member, so that it becomes possible to avoid a situation where the rotational operation of the sun gear is hindered by the restriction member, and smoothly perform the rotational operation of the sun gear by using the sun gear operating member.

More preferably, in this reclining mechanism having the above feature, the sun gear operating member has a push-operation portion for pushing the sun gear to rotate it. The restriction releasing convex portion pushes and displaces, according to a movement of the sun gear operating member for rotationally operating the sun gear in the specific direction, the restriction member in the specific direction, before the push-operation portion pushes the sun gear.

According to this feature, when a seat occupant operates the sun gear operating member in order to displace the seat back in the rearward tilting direction, the restriction releasing convex portion is operable to push and displace the restriction member toward the specific direction (in a direction causing the width of the wedge-shaped space to become wider) before the push-operation portion pushes the sun gear, so that it becomes possible to more reliably avoid the situation where the rotational operation of the sun gear is hindered by the restriction member.

More preferably, in this reclining mechanism having the above feature, the restriction member is composed of a columnar-shaped member having a locking hole along an axis thereof. The biasing member has: an open ring-shaped member body; a sun gear engagement section provided at one end of the member body and locked to the sun gear; and a restriction member engagement section provided at the other end of the member body and inserted in the locking hole of the restriction member.

According to this feature, the restriction member engagement section of the biasing member is inserted into the locking hole provided in the restriction member along an axis thereof. In this case, the restriction member can be reliably biased in the counter direction by the biasing member while preventing the restriction member from being disengaged from the biasing member.

Preferably, in the reclining mechanism having the basic feature, the opposing wall section of the sun gear has a first wall surface region and a second wall surface region. The first wall surface region of the opposing wall section and the inner peripheral wall of the holding member define therebetween the wedge-shaped space referred to as a first wedge-shaped space whose width is gradually narrowed toward the counter direction, and the second wall surface region of the opposing wall section and the inner peripheral wall of the holding member define therebetween a second wedge-shaped space whose width is gradually narrowed toward the specific direction. The restriction member referred to as a first restriction member is displaceably disposed in the first wedge-shaped space to restrict the holding member from being rotated with respect to the sun gear in the specific direction. The reclining mechanism further comprises a second restriction member displaceably disposed in the second wedge-shaped space to restrict the holding member from being rotated with respect to the sun gear in the counter direction.

According to this feature, when a force in the rearward tilting direction is applied to the seat back, the first restriction member is relatively pushed toward the counter direction (i.e., in a direction causing a width of the first wedge-shaped space to become narrower) within the first wedge-shaped space, and thereby a force is applied to the opposing wall section of the sun gear and the inner peripheral wall of the holding member to urge them to be displaced away from each other while interposing the first restriction member therebetween, so that it becomes possible to eliminate a gap between each of the planetary gears and a respective one of the internal gears of the first and second plates, and thus prevent rolling displacement of the planetary gears. Thus, even if a force in the rearward tilting direction is repeatedly applied to the seat back, the planetary gears and the holding member can be reliably maintained in a fixed state to effectively prevent the seat back from being moved in the rearward tilting direction.

On the other hand, when a force in a forward tilting direction is applied to the seat back, the second restriction member is relatively pushed toward the specific direction (i.e., in a direction causing a width of the second wedge-shaped space to become narrower) within the second wedge-shaped space, and thereby a force is applied to the opposing wall section of the sun gear and the inner peripheral wall of the holding member to urge them to be displaced away from each other while interposing the second restriction member therebetween, so that it becomes possible to eliminate a gap between each of the planetary gears and a respective one of the internal gears of the first and second plates, and thus prevent rolling displacement of the planetary gears. Thus, even if a force in the forward tilting direction is repeatedly applied to the seat back, the planetary gears and the holding member can be reliably maintained in a fixed state to effectively prevent the seat back from being moved in the forward tilting direction.

More preferably, the reclining mechanism having the above feature further comprises: a biasing member biasing the first restriction member disposed in the first wedge-shaped space, in the counter direction, and biasing the second restriction member disposed in the second wedge-shaped space, in the specific direction; and a sun gear operating member for rotationally operating the sun gear. The sun gear operating member has a first restriction releasing section for releasing the restriction by the first restriction member, and a second restriction releasing section for releasing the restriction by the second restriction member. The first restriction releasing section pushes, according to a movement of the sun gear operating member for rotationally operating the sun gear in the specific direction, the first restriction member against a biasing force of the biasing member to displace the first restriction member in the specific direction within the first wedge-shaped space. The second restriction releasing section pushes, according to a movement of the sun gear operating member for rotationally operating the sun gear in the counter direction, the second restriction member against a biasing force of the biasing member to displace the second restriction member in the counter direction within the second wedge-shaped space.

According to this feature, the biasing member is operable to bias the first restriction member toward the counter direction (in a direction causing the width of the first wedge-shaped space to become narrower), and biasing the second restriction member toward the specific direction (in a direction causing the width of the second wedge-shaped space to become narrower). In this case, it becomes possible to prevent the first restriction member or the second restriction member from being displaced in conjunction with a movement of the holding member. Thus, even when a force in either one of the rearward and forward tilting directions is applied to the seat back, the seat back can be reliably maintained in a fixed state by using the first restriction member or the second restriction member.

In addition, when a seat occupant operates the sun gear operating member in order to displace the seat back in the rearward tilting direction, the first restriction releasing section is operable to push and displace the first restriction member toward the specific direction (in a direction causing the width of the first wedge-shaped space to become wider) according to the rotation of the sun gear operating member, so that it becomes possible to avoid a situation where the rotational operation of the sun gear is hindered by the first restriction member, and smoothly perform the rotational operation of the sun gear by using the sun gear operating member.

On the other hand, when a seat occupant operates the sun gear operating member in order to displace the seat back in the forward tilting direction, the second restriction releasing section is operable to push and displace the second restriction member toward the counter direction (in a direction causing the width of the second wedge-shaped space to become wider) according to the rotation of the sun gear operating member, so that it becomes possible to avoid a situation where the rotational operation of the sun gear is hindered by the second restriction member, and smoothly perform the rotational operation of the sun gear by using the sun gear operating member.

More preferably, the reclining mechanism having the above feature, the sun gear operating member has a first push-operation portion for pushing the sun gear to rotate it in the specific direction, and a second push-operation portion for pushing the sun gear to rotate it in the counter direction. The first restriction releasing section pushes and displaces, according to a movement of the sun gear operating member for rotationally operating the sun gear in the specific direction, the first restriction member in the specific direction, before the first push-operation portion pushes the sun gear. The second restriction releasing section pushes and displaces, according to a movement of the sun gear operating member for rotationally operating the sun gear in the counter direction, the second restriction member in the counter direction, before the second push-operation portion pushes the sun gear.

According to this feature, when a seat occupant operates the sun gear operating member in order to displace the seat back in the rearward tilting direction, the first restriction releasing section is operable to push and displace the first restriction member toward the specific direction (in a direction causing the width of the first wedge-shaped space to become wider) before the first push-operation portion pushes the sun gear, so that it becomes possible to more reliably avoid the situation where the rotational operation of the sun gear is hindered by the first restriction member.

On the other hand, when a seat occupant operates the sun gear operating member in order to displace the seat back in the forward tilting direction, the second restriction releasing section is operable to push and displace the second restriction member toward the counter direction (in a direction causing the width of the second wedge-shaped space to become wider) before the second push-operation portion pushes the sun gear, so that it becomes possible to more reliably avoid the situation where the rotational operation of the sun gear is hindered by the second restriction member.

This application is based on Japanese Patent applications No. 2011-258025 and No. 2011-258026 filed in Japan Patent Office on Nov. 25, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A reclining mechanism comprising:
   a ring-shaped first plate fixed to a seat back;
   a ring-shaped second plate capable of rotating with respect to the first plate and fixed to a seat cushion;
   a plurality of planetary gears in meshing engagement with internal gears provided in respective inner peripheries of the first plate and the second plate;
   a sun gear in meshing engagement with the planetary gears;
   a holding member rotatably holding the planetary gears and having an inner peripheral wall surrounding the sun gear; and a restriction member for restricting a rotation of the holding member with respect to the sun gear, wherein:

the sun gear has an opposing wall section opposed to the inner peripheral wall of the holding member;

the opposing wall section of the sun gear and the inner peripheral wall of the holding member define therebetween a wedge-shaped space in which the restriction member is displaceably disposed; and the opposing wall section of the sun gear is formed such that a width of the wedge-shaped space is gradually narrowed toward a counter direction with respect to a specific direction, where the specific direction is a direction along which the first plate is urged to be rotated according to a force applied to the seat back in a rearward tilting direction, and the counter direction is a direction opposite to the specific direction.

2. The reclining mechanism as defined in claim 1, further comprising a biasing member biasing the restriction member disposed in the wedge-shaped space, in the counter direction.

3. The reclining mechanism as defined in claim 2, further comprising a sun gear operating member for rotationally operating the sun gear, wherein:

the sun gear operating member has a restriction releasing convex portion for releasing the restriction by the restriction member; and the restriction releasing convex portion pushes, according to a movement of the sun gear operating member for rotationally operating the sun gear in the specific direction, the restriction member against a biasing force of the biasing member to displace the restriction member in the specific direction within the wedge-shaped space.

4. The reclining mechanism as defined in claim 3, wherein:

the sun gear operating member has a push-operation portion for pushing the sun gear to rotate it; and the restriction releasing convex portion pushes and displaces, according to a movement of the sun gear operating member for rotationally operating the sun gear in the specific direction, the restriction member in the specific direction, before the push-operation portion pushes the sun gear.

5. The reclining mechanism as defined in claim 2, wherein:

the restriction member is composed of a columnar-shaped member having a locking hole along an axis thereof; and the biasing member has an open ring-shaped member body, a sun gear engagement section provided at one end of the member body and locked to the sun gear, and a restriction member engagement section provided at the other end of the member body and inserted in the locking hole of the restriction member.

6. The reclining mechanism as defined in claim 1, wherein:

the opposing wall section of the sun gear has a first wall surface region and a second wall surface region;

the first wall surface region of the opposing wall section and the inner peripheral wall of the holding member define therebetween the wedge-shaped space referred to as a first wedge-shaped space whose width is gradually narrowed toward the counter direction;

the second wall surface region of the opposing wall section and the inner peripheral wall of the holding member define therebetween a second wedge-shaped space whose width is gradually narrowed toward the specific direction, the restriction member referred to as a first restriction member is displaceably disposed in the first wedge-shaped space to restrict the holding member from being rotated with respect to the sun gear in the specific direction; and a second restriction member is displaceably disposed in the second wedge-shaped space to restrict the holding member from being rotated with respect to the sun gear in the counter direction.

7. The reclining mechanism as defined in claim 6, further comprising: a biasing member biasing the first restriction member disposed in the first wedge-shaped space, in the counter direction, and biasing the second restriction member disposed in the second wedge-shaped space, in the specific direction; and a sun gear operating member for rotationally operating the sun gear, wherein:

the sun gear operating member has a first restriction releasing section for releasing the restriction by the first restriction member, and a second restriction releasing section for releasing the restriction by the second restriction member;

the first restriction releasing section pushes, according to a movement of the sun gear operating member for rotationally operating the sun gear in the specific direction, the first restriction member against a biasing force of the biasing member to displace the first restriction member in the specific direction within the first wedge-shaped space; and the second restriction releasing section pushes, according to a movement of the sun gear operating member for rotationally operating the sun gear in the counter direction, the second restriction member against a biasing force of the biasing member to displace the second restriction member in the counter direction within the second wedge-shaped space.

8. The reclining mechanism as defined in claim 7, wherein:

the sun gear operating member has a first push-operation portion for pushing the sun gear to rotate it in the specific direction, and a second push-operation portion for pushing the sun gear to rotate it in the counter direction;

the first restriction releasing section pushes and displaces, according to a movement of the sun gear operating member for rotationally operating the sun gear in the specific direction, the first restriction member in the specific direction, before the first push-operation portion pushes the sun gear; and the second restriction releasing section pushes and displaces, according to a movement of the sun gear operating member for rotationally operating the sun gear in the counter direction, the second restriction member in the counter direction, before the second push-operation portion pushes the sun gear.

* * * * *